(12) United States Patent
Risafi et al.

(10) Patent No.: US 8,675,840 B2
(45) Date of Patent: *Mar. 18, 2014

(54) SYSTEM AND METHOD FOR USING A PREPAID CARD

(75) Inventors: Nicole N. Risafi, Stamford, CT (US); Burnett D. Hunter, Elmsford, NY (US); Kevin McKenzie, O'Fallon, MO (US); Janice Wiggins, New Fairfield, CT (US); Brian Stangle, New Fairfield, CT (US); Vincent Forte, Morristown, NJ (US)

(73) Assignee: MasterCard International Incorporated, Purchase, NY (US)

( * ) Notice: Subject to any disclaimer, the term of this patent is extended or adjusted under 35 U.S.C. 154(b) by 1640 days.

This patent is subject to a terminal disclaimer.

(21) Appl. No.: 11/285,843

(22) Filed: Nov. 23, 2005

(65) Prior Publication Data

US 2006/0078100 A1    Apr. 13, 2006

Related U.S. Application Data

(63) Continuation of application No. 10/128,633, filed on Apr. 23, 2002, now Pat. No. 6,999,569, which is a continuation-in-part of application No. 09/181,377, filed on Oct. 28, 1998, now Pat. No. 6,473,500.

(60) Provisional application No. 60/285,726, filed on Apr. 23, 2001.

(51) Int. Cl.
*H04M 15/00* (2006.01)

(52) U.S. Cl.
USPC .............. 379/114.2; 379/114.15; 379/114.19

(58) Field of Classification Search
USPC ................... 379/114.01, 114.15–11, 144.01, 379/144.04, 114.15–114.21; 705/403, 39, 705/40; 235/2, 379, 380; 902/26, 27
See application file for complete search history.

(56) References Cited

U.S. PATENT DOCUMENTS

| 4,877,947 | A | | 10/1989 | Mori |
| 5,132,521 | A | | 7/1992 | Smith et al. |
| 5,221,838 | A | * | 6/1993 | Gutman et al. ............... 235/379 |
| 5,477,038 | A | | 12/1995 | Levine et al. |
| 5,511,114 | A | | 4/1996 | Stimson et al. |
| 5,577,109 | A | | 11/1996 | Stimson et al. |

(Continued)

FOREIGN PATENT DOCUMENTS

| AU | 762981 | 5/2000 |
| WO | WO 98/25237 | 6/1998 |
| WO | WO 00/11568 | 3/2000 |
| WO | WO 00/25507 | 5/2000 |

OTHER PUBLICATIONS

U.S. Appl. No. 10/128,633, Non-Final Rejection dated Sep. 9, 2004.

(Continued)

*Primary Examiner* — Quoc D Tran
(74) *Attorney, Agent, or Firm* — Baker Botts LLP

(57) ABSTRACT

A system and method for transferring money by use of a prepaid card account is disclosed wherein two cards are issued to the user accountholder, one of which is provided to another user, and either user may add value to the prepaid account so that the other user may use the card and that value in a financial transaction.

6 Claims, 15 Drawing Sheets

Money Transfer Using Prepaid Cards

(56) References Cited

U.S. PATENT DOCUMENTS

| | | | |
|---|---|---|---|
| 5,621,787 | A | 4/1997 | McKoy et al. |
| 5,663,546 | A | 9/1997 | Cucinotta et al. |
| 5,673,309 | A | 9/1997 | Woynoski et al. |
| 5,696,908 | A | 12/1997 | Muehlberger et al. |
| 5,704,046 | A | 12/1997 | Hogan |
| 5,721,768 | A | 2/1998 | Stimson et al. |
| 5,760,381 | A | 6/1998 | Stich et al. |
| 5,777,305 | A | 7/1998 | Smith et al. |
| 2,324,185 | A | 9/1998 | Standford et al. |
| 5,814,796 | A | 9/1998 | Benson et al. |
| 5,828,740 | A | 10/1998 | Khuc et al. |
| 5,868,236 | A | 2/1999 | Rademacher |
| 5,869,825 | A | 2/1999 | Ziarno |
| 5,892,827 | A | 4/1999 | Beach et al. |
| 5,903,633 | A | 5/1999 | Lorsch |
| 5,905,736 | A | 5/1999 | Ronen et al. |
| 5,907,832 | A | 5/1999 | Pieterse et al. |
| 5,995,822 | A | 11/1999 | Smith et al. |
| 6,000,608 | A | 12/1999 | Dorf |
| 6,021,189 | A | 2/2000 | Vu |
| 6,021,943 | A | 2/2000 | Chastain |
| 6,028,920 | A | 2/2000 | Carson |
| 6,044,360 | A * | 3/2000 | Picciallo ............ 705/21 |
| 6,085,168 | A | 7/2000 | Mori et al. |
| 6,189,787 | B1 | 2/2001 | Dorf |
| 6,298,336 | B1 | 10/2001 | Davis et al. |
| 6,356,868 | B1 * | 3/2002 | Yuschik et al. ........... 704/246 |
| 6,367,011 | B1 | 4/2002 | Lee et al. |
| 6,422,459 | B1 | 7/2002 | Kawan |
| 6,473,500 | B1 * | 10/2002 | Risafi et al. ........... 379/144.01 |
| 6,999,569 | B2 * | 2/2006 | Risafi et al. ........... 379/144.01 |
| 7,252,226 | B2 | 8/2007 | Risafi et al. |
| 2001/0023415 | A1 | 9/2001 | Keil |
| 2002/0077973 | A1 | 6/2002 | Ronchi et al. |
| 2002/0091632 | A1 * | 7/2002 | Turock et al. ........... 705/39 |
| 2002/0120563 | A1 | 8/2002 | McWilliam et al. |

OTHER PUBLICATIONS

U.S. Appl. No. 10/128,633, Response to Non-Final Rejection dated Dec. 13, 2004.
U.S. Appl. No. 10/128,633, Final Rejection dated May 9, 2005.
U.S. Appl. No. 10/128,633, Amendment After Final dated Aug. 11, 2005.
U.S. Appl. No. 10/128,633, Notice of Allowance dated Aug. 23, 2005.
U.S. Appl. No. 09/181,377, Non-Final Rejection dated Oct. 4, 1999.
U.S. Appl. No. 09/181,377, Response to Non-Final Rejection dated Apr. 12, 2000.
U.S. Appl. No. 09/181,377, Final Rejection dated Jun. 22, 2000.
U.S. Appl. No. 09/181,377, Amendment After Final dated Sep. 22, 2000.
U.S. Appl. No. 09/181,377, Advisory Action dated Oct. 11, 2000.
U.S. Appl. No. 09/181,377, Request for Continued Examination dated Dec. 27, 2000.
U.S. Appl. No. 09/181,377, Non-Final Rejection dated Mar. 12, 2001.
U.S. Appl. No. 09/181,377, Response to Non-Final Rejection dated Apr. 9, 2001.
U.S. Appl. No. 09/181,377, Restriction Requirement dated Jun. 5, 2001.
U.S. Appl. No. 09/181,377, Non-Final Rejection dated Oct. 9, 2001.
U.S. Appl. No. 09/181,377, Response to Non-Final Rejection dated Apr. 15, 2002.
U.S. Appl. No. 09/181,377, Notice of Allowance dated Jun. 4, 2002.
U.S. Appl. No. 10/234,558, Non-Final Rejection dated Feb. 6, 2003.
U.S. Appl. No. 10/234,558, Response to Non-Final Rejection dated May 6, 2003.
U.S. Appl. No. 10/234,558, Final Rejection dated Jul. 21, 2003.
U.S. Appl. No. 10/234,558, Amendment After Final dated Oct. 14, 2003.
U.S. Appl. No. 10/234,558, Advisory Action dated Nov. 19, 2003.
U.S. Appl. No. 10/234,558, Response to Final Rejection and RCE dated Dec. 22, 2003.
U.S. Appl. No. 10/234,558, Non-Final Rejection dated Mar. 29, 2004.
U.S. Appl. No. 10/234,558, Response to Non-Final Rejection dated Jul. 1, 2004.
U.S. Appl. No. 10/234,558, Final Rejection dated Sep. 14, 2004.
U.S. Appl. No. 10/234,558, Response to Final Rejection and RCE dated Mar. 17, 2005.
U.S. Appl. No. 10/234,558, Non-Final Rejection dated May 25, 2005.
U.S. Appl. No. 10/234,558, Response to Non-Final Rejection dated Jul. 29, 2005.
U.S. Appl. No. 10/234,558, Final Rejection dated Oct. 19, 2005.
U.S. Appl. No. 10/234,558, Amendment After Final dated Jan. 17, 2006.
U.S. Appl. No. 10/234,558, Appeal Brief filed May 22, 2006.
U.S. Appl. No. 10/234,558, Appeal Brief filed Sep. 5, 2006.
U.S. Appl. No. 10/234,558, Appeal Brief filed Nov. 13, 2006.
U.S. Appl. No. 10/234,558, Notice of Allowance dated Apr. 10, 2007.

* cited by examiner

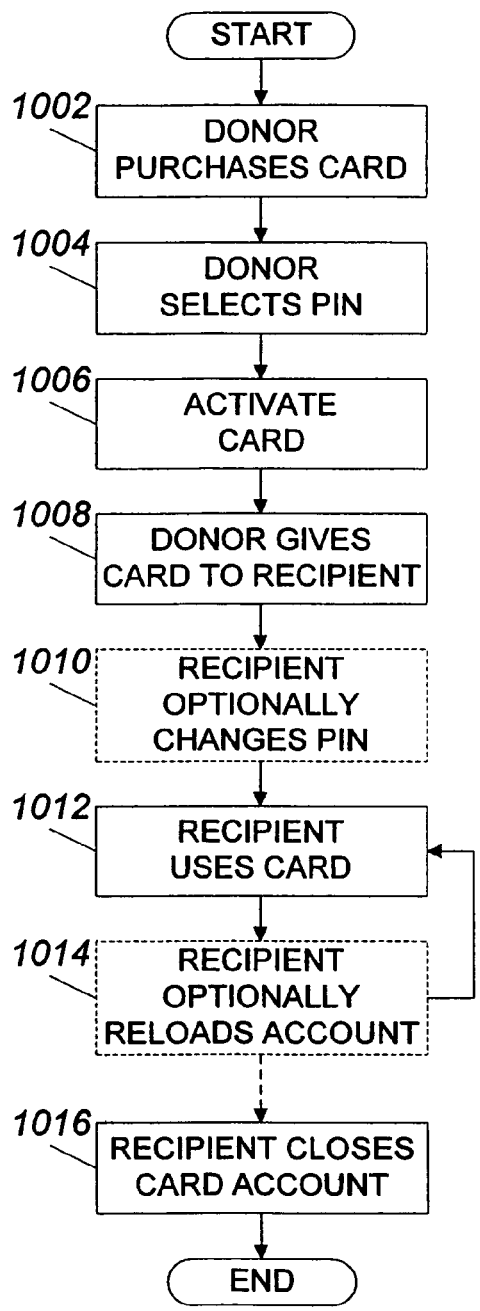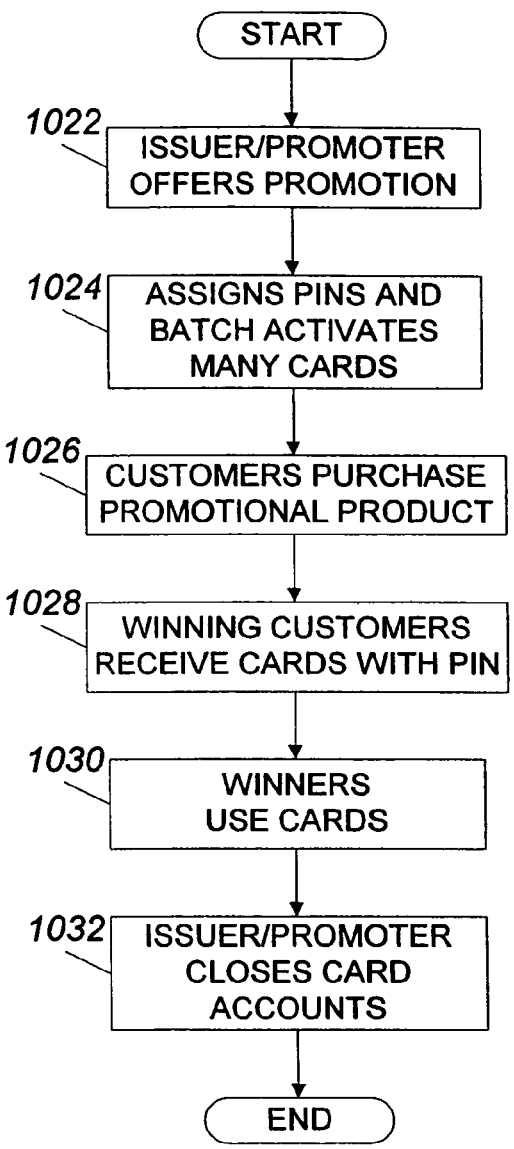
FIG. 10a
FIG. 10b

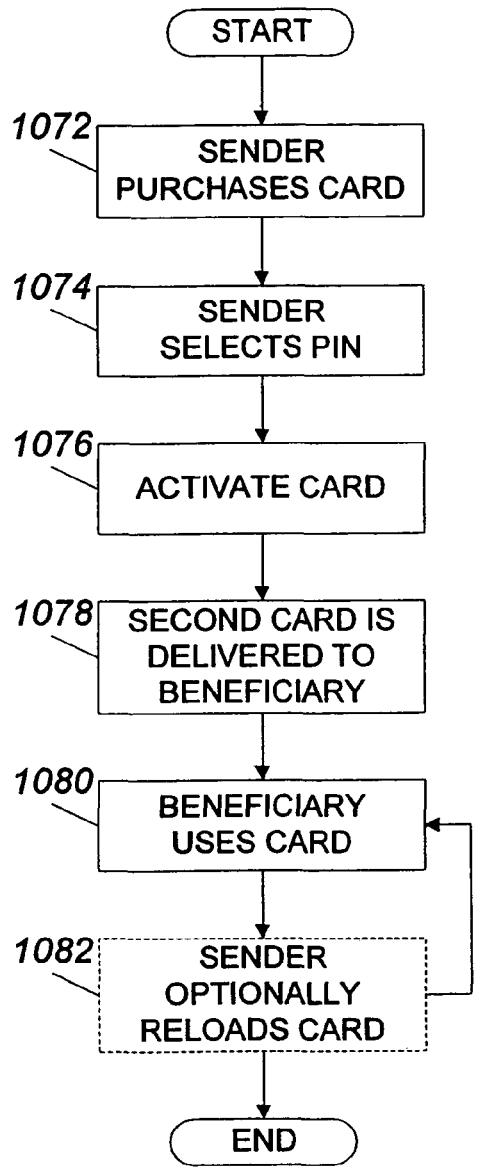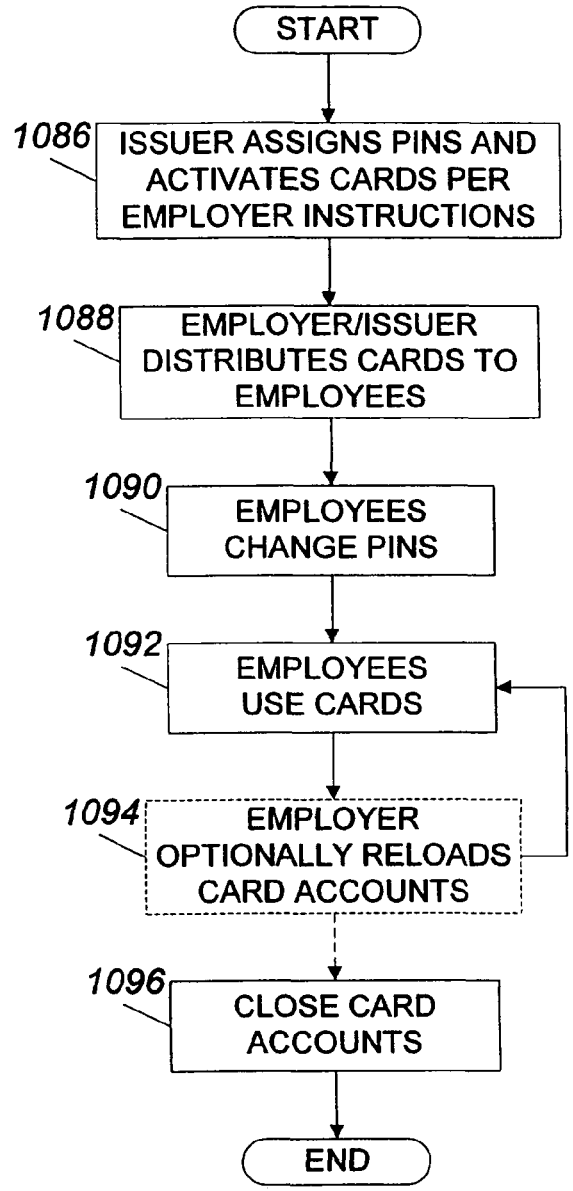
FIG. 10c
FIG. 10d

Money Transfer Using Prepaid Cards

SYSTEM AND METHOD FOR USING A PREPAID CARD

PRIORITY APPLICATION

This application is a continuation of U.S. patent application Ser. No. 10/128,633 filed on Apr. 23, 2002, which issued as U.S. Pat. No. 6,999,569 and is a continuation-in-part of U.S. patent application Ser. No. 09/181,377 filed on Oct. 28, 1998, which issued as U.S. Pat. No. 6,473,500, and claims priority to provisional application No. 60/285,726 filed on Apr. 23, 2001, each of which is hereby incorporated by reference in its entirety for all purposes.

FIELD OF THE INVENTION

This invention relates to prepaid cards used to purchase goods or services, including telephone services.

BACKGROUND OF THE INVENTION

Electronic payments are fast becoming the means for conducting consumer transactions around the world. Instead of using cash, consumers are using many different types of cards to buy a wide range of items. These consumer card types include credit, debit, and prepaid cards.

Credit cards have been in existence for a relatively long time. Retail stores initially issued these cards for use in the store or chain of stores. The store extends credit to a customer to purchase items and requires payment at the end of a billing cycle.

Credit card processing networks, such as the MasterCard® network, now exist, allowing consumers to use one credit card to shop at a variety of merchants. With this type of card, a card issuer, such as a bank, extends credit to a consumer to purchase products or services. When a consumer makes a purchase from an approved merchant, the card number and amount of the purchase, along with other relevant information, are transmitted via the processing network to a processing center which verifies that the card has not been reported lost or stolen and that the card's credit limit has not been exceeded. In some cases, the consumer's signature is also verified. The consumer is required to repay the bank for the purchases, generally on a monthly basis. Typically, if the bank is not fully repaid by the due date, the consumer incurs a finance charge. The card issuer may also charge an annual fee.

Debit cards are also currently in use. They are typically linked to the cardholder's existing deposit account at a bank. There are generally two types of debit cards—"on-line" and "off-line." When a consumer makes a purchase using an on-line debit card, the consumer inputs a personal identification number ("PIN") to a terminal that is connected to a central processing center over a network. The center verifies the card number and PIN during the transaction, and the linked deposit account is immediately debited the amount of the purchase. When a purchase is made using an off-line debit card, and there is no connection to a central processing center, the customer's signature is typically used to verify the identity of the cardholder in much the same way as is done with credit cards. The information is later sent into a central processing center or directly to the relevant bank. A PIN may also be used in conjunction with off-line debit cards.

Another type of consumer card is a prepaid card. A consumer purchases the card for a particular amount of money. The cash value of the card is typically stored in either of two ways. The value can be indicated by data stored in the memory of the card. Alternatively, in a card having a magnetic stripe or in some cards having an integrated circuit ("IC") on them, value is indicated by data stored in a central host, which can be accessed using information stored on a magnetic stripe on the back of the card. Verification of the identity of the purchaser of the card is typically not required. With either an IC-type card or a magnetic stripe-type prepaid card, value is preloaded before a purchase is made. In addition, individual users of prepaid cards typically have no demand deposit account ("DDA") relationship with the financial institution that holds the prepaid card funds. When a consumer uses a prepaid card to make a purchase, the data indicating the value currently associated with the card is decreased by the amount of the purchase and any fees, if applicable. If the prepaid cards are not linked to a central host, the value indicated on the card will typically be unrecoverable if the card is lost.

Prepaid cards have been issued in association with particular merchants. These cards can be used only when purchasing goods or services from that particular merchant, similar to the limited usage associated with store credit cards. The cards are typically available in preset denominations (e.g., $10, $50, $100) and may or may not be activated before they are shipped to the store. If preactivated, and stolen by an unscrupulous employee or others, a card could be used immediately to make purchases before the theft was discovered. At any time after a customer purchases this type of card from a particular merchant, the card can be used to buy goods or services from that merchant. The purchase process typically operates as follows. The cardholder presents the card for payment. The store attendant verifies the card number through a terminal which communicates with a store network and causes a debit of the amount of the purchase to the account associated with the card. When the card's value is depleted, the card is typically discarded.

This type of prepaid card has several drawbacks. First, the cards are typically only offered in preset denominations, severely limiting flexibility in purchasing. Second, the cards are generally not reloadable, requiring customers to purchase additional cards when the value associated with the original card is depleted. Third, the cards are only usable when making purchases from the particular merchant. Finally, the cards may arrive at the store already activated or may be activated in bulk, by the merchant upon receipt, subjecting them to possible unauthorized use. For example, the merchant's employees could use or give away the cards when the cards are at the store, or others could illegally use the cards if they are lost or stolen while being shipped to the merchant.

A widespread current application of payment cards is for telephone services. These purchases have been made on either a credit or prepaid basis. On a credit basis, a telephone services company ("TELCO") issues a calling card having a card number. When these cards first appeared, the card number was typically the cardholder's home telephone number (10 digits) plus an extra 4-digit number. However, today, the card number is more likely not related to a home telephone number. This 4-digit number, similar to a PIN, is typically assigned to the cardholder by the TELCO, and it sometimes appears on the card along with the card number. When a cardholder uses this type of calling card to make a call, the charge appears on the cardholder's monthly telephone statement. If the 4-digit number appears on the card and the card is lost or stolen, until the card is reported missing, anyone possessing the card can illegally use the card and cause the owner of the card to incur large phone charges.

Telephone services may also be paid for on a prepaid basis. Such prepaid cards, issued by TELCOs and other companies who buy and resell time from TELCOs, are widely available at many retail establishments. The cards typically have 10-digit card numbers and a 4-digit PIN that is assigned by the card issuer. The card number and PIN are printed on the card. The cards are available in preset denominations each corresponding to an amount of "phone units." A "phone unit" is usually related to the time and, in some cases, the distance of the call. An account is set up by the card issuer to keep track of how many phone units are associated with the card. These cards are typically sold by a TELCO, a service provider, or a retailer and are activated by the TELCO when a cardholder calls a customer service number (usually via a toll-free number) after purchasing the card. The initial value associated with the card is predetermined and the card number and PIN are preassigned. Anyone who has access to the card and the PIN is able to use the card. To use the card, the consumer typically calls the TELCO's customer service or access telephone number, enters the card number, the PIN, and the telephone number to be called. The card issuer, or a service bureau acting on its behalf, keeps track of how many phone units remain on the card and decrements the remaining units based on the duration and, in some cases, distance of the call. When the consumer uses up the phone units on the card, the consumer typically disposes of the card and purchases a new card to make additional phone calls.

The telephone application may also be combined with other applications on a single card. Thus, prepaid cards associated with a particular merchant may also be associated with a TELCO and be used to pay for telephone calls on a prepaid basis.

As currently implemented, using a telephone application on a prepaid card has several drawbacks. If the PIN is not written on the card, it is difficult for the cardholder to remember the PIN when using the card to make phone calls because the PIN is assigned by the card issuer. If the PIN is written on the card, then the phone units that remain on a lost or stolen card can be used by anyone. As with the merchant-based prepaid cards, the cardholder is required to purchase a new prepaid telephone card when the phone units are used up. As a result, it is even more difficult for a cardholder to remember a PIN, because the PIN keeps changing with every new card purchased.

It would, therefore, be advantageous to have a prepaid card that addresses the above-noted problems of merchant-based prepaid cards and prepaid telephone cards. It would be advantageous to provide a card that is more flexible than the cards typically available today, that allows a cardholder to purchase a card without an issuer-established preset value and to select a PIN that is easily remembered, a card that is preferably reloadable, and that also allows purchases to be made from a wide variety of merchants. It would also be advantageous to provide a card that is individually activated at the point of sale, so that the card would not be able to be used by unscrupulous employees or other individuals who may intercept the card in transit between the card issuer and the point of sale, or when it is displayed at the point of sale.

SUMMARY OF THE INVENTION

It is therefore an object of the present invention to present a system and a method for using a prepaid card that offers the flexibility needed in transacting electronic payments. In addition to the prepaid card, the system includes a card user, a card issuer, an agent who sells or distributes the card, a terminal, and a prepaid card processing center. The card issuer, such as a bank, issues a card and offers it for sale or distribution through its own branches or through an agent or network of agents. The terminal, which can be located at a bank, a merchant, or a program sponsor, performs various functions including card activation, PIN selection and change, card account reloading, balance inquiry, and transaction history. The user selects a PIN of his or her choice upon inserting the purchased card into a terminal or by accessing another designated device, such as an interactive voice response unit ("IVRU"). The terminal reads pre-encoded card identification data such as a card number (which is stored on the card) and transmits over a network to the card processing center the information from the card and the PIN selected by the consumer. The card processing center stores the card number, PIN, and the balance in an account file. The card user is able to use the card at any terminal or other designated device connected through a network to the processing center to buy goods and services, to withdraw cash, and to add value to the card. The cardholder may also change the PIN using these devices. When conducting any of these transactions, the card processing center verifies the transaction's validity by checking the stored card number and PIN against the card number read by the terminal and the PIN entered by the card user for that transaction.

The method for using the prepaid card includes purchasing a card issued by an issuer, perhaps through an agent at a retail establishment via an agent terminal, selecting a PIN, selecting the opening account balance, having the card activated at the point of purchase, and, over time, using the card to purchase goods and/or services. The PIN and the card number are transmitted over a communications network to the card processing center to be stored in an account file associated with that card number. Also transmitted and stored in the account file is the amount of value purchased. The balance remaining on the card after a purchase or purchases are made will be kept in the account file. Unlike currently available cards which are activated by the card issuer at the time of issuance or in bulk by the merchant at the time of receipt or by the cardholder by calling a designated telephone number after purchase, the card according to the present invention is activated on an individual basis when the card user purchases the card, making the card more secure prior to purchase. In addition, unlike card-issuer-activated cards, the card user herein is not limited to purchasing monetary value in denominations preset by the card issuer. Once activated, the card user can immediately use the card to make purchases or cash withdrawals, and the card user can replenish the value on the card at any appropriate terminal connected to the PDC platform. Also, unlike card-issuer-activated cards whose PINs are assigned by the issuer and are thereafter unchangeable, the method of the present invention does not require the cardholder to accept the issuer-assigned PIN, allows the cardholder to select a PIN, and allows a cardholder to change that PIN at any time after the initial selection.

The invention is also directed to the use of prepaid cards to purchase telephone services. An issuer issues the prepaid telephone card through an agent, such as a retail merchant, who sells or distributes it in any desired denomination to a card user. The agent transmits over the communications network to the prepaid card processing center the card number, PIN, and purchase amount. The card processing center either establishes an account file with those pieces of information or serves as a link to a third party, and the card is activated at the time of purchase and can be used for making telephone calls. This card, too, is reloadable at any appropriate terminal connected to the PDC platform and the PIN is selected by the cardholder.

The activation of the card can be done on an individual basis (one card at a time) or on a batch basis (many cards at a time). When the activation is performed on an individual basis, the PIN is selected, and the card number, PIN, and initial balance are transmitted via the communications network to the card processing center which establishes an account file storing this information. When the activation is performed on a batch basis, an entity assigns a PIN and initial balance to each card number, transmits the information to the card processing center, either via the communications network or by some other process such as magnetic tape, and then distributes the cards to the card users. Each card user has the option to change the PIN to one that can be easily remembered. Cash value can be added to the card, either on an individual basis or on a batch basis, and this cash value may be added periodically, at regular intervals or on a more random basis.

The invention is used in other areas. The invention is also directed to the use of prepaid cards to fulfill payroll obligations, facilitate gift-giving, promote the purchase of specific products or services, transfer money between at least two cardholders, purchase corporate relocation expenses, and manage incentive programs to reward employees, dealers, and others.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 3b is a schematic of the back of the card illustrated in FIG. 3a;

FIG. 10a is a flowchart illustrating a process for using a prepaid card as a gift in accordance with an embodiment of the invention;

FIG. 10b is a flowchart illustrating a process for using a prepaid card in a commercial promotion in accordance with an embodiment of the invention;

FIG. 10c is a flowchart illustrating a process for using a prepaid card to transfer money in accordance with an embodiment of the invention;

FIG. 10d is a flowchart illustrating a process for using a prepaid card to facilitate corporate relocation in accordance with an embodiment of the invention.

Figure 1:
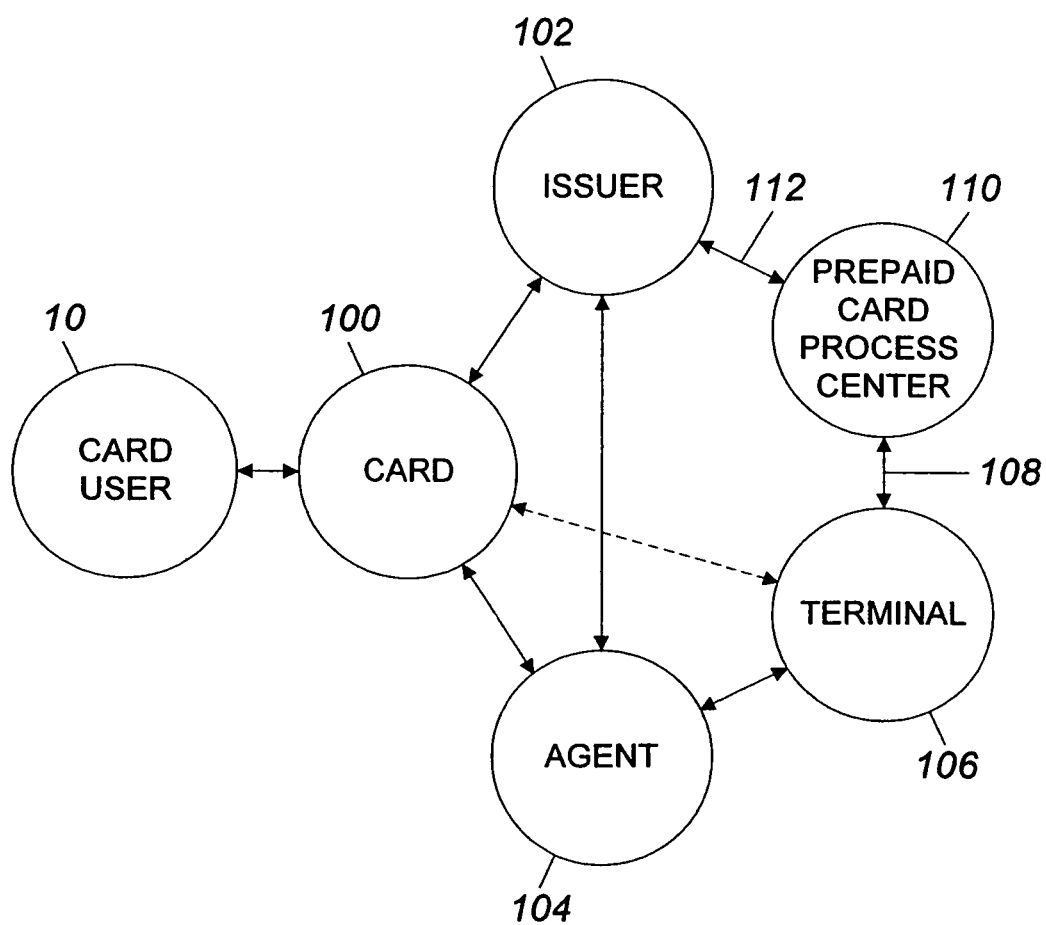
FIG. 1 is a diagram of the components of a system for using a prepaid card in accordance with the invention.

Throughout the figures, unless otherwise stated, the same reference numerals and characters are used to denote like features, elements, components, or portions of the illustrated embodiments. Moreover, while the subject invention will now be described in detail with reference to the figures and in connection with the illustrative embodiments, changes and modifications can be made to the described embodiments without departing from the true scope and spirit of the subject invention as defined by the appended claims.

DETAILED DESCRIPTION OF THE INVENTION

In accordance with the present invention, a prepaid card is provided which is activated only when a card user purchases the card or a program sponsor issues a card on behalf of the card user. The card user is then able to select a PIN of his or her choosing, and is able to use the card at any merchant or terminal (including different merchant terminals and automatic teller machines ("ATMs")) connected to a designated central processing center. Additionally, the card is preferably reloadable so that the same card can be used over and over again.

In one method of activation, a consumer purchases a prepaid card either at a point-of-sale location (merchant), at an ATM, at any designated/approved card dispensing device, or from a card issuer or designated agent of the card issuer. The consumer then selects a PIN for the purchased card. The terminal then transmits the card identification data, PIN, and initial balance amount to the central processing center by any approved transmission medium or method, and the processing center sets up a card account comprising the received transmitted data.

In another method of activation, a program sponsor causes the card to be issued on behalf of a card user and assigns a PIN to the card. The card issuer transmits the card identification data, assigned PIN, and initial balance amount to the processing center which sets up a card account. The consumer then has the option to change the PIN for the issued card.

Once the card is activated, the card is immediately ready for use all over the world at a wide variety of approved establishments, ATMs, or merchants, or for special uses (e.g., telephone cards). The PIN does not appear on the card, but, because it has been selected by the consumer, the PIN is easily remembered. In a manner similar to the purchase of the card, the consumer may add value to the card account at any point-of-sale ("POS") terminal, ATM, approved IVR, or other approved device connected to the network, and the added value is immediately available for making purchases or cash withdrawals. This system can be used in traveling, either domestically or abroad, to facilitate purchases, cash withdrawals or for the purchase of specific services. Advantageously, these cards are useful for consumers who are not eligible for a credit card (either a store credit card or one connected to an association processing network), who do not have a bank account with which a financial card may be linked, or who do not want to incur credit card debt. The cards are also useful to businesses that wish to promote their products or services, reward employees or business partners, or deliver employee benefits.

The system and method of the present invention have several advantages over the prior art systems using prepaid cards. First, because the card is not shipped to the agent with a PIN and value pre-stored on the card ready for use, the card can be purchased by the card user in any denomination allowed by the issuer. Second, when purchasing the card, the card user can select a PIN that is easily remembered and can change that PIN after the initial account activation. Third, because the cards are not activated before they are shipped, there is no danger of employee theft or of someone intercepting the shipment and using the monetary value associated with the card. Fourth, because the system includes a central processing center which communicates with many merchants and service providers, the card can be purchased and the card account reloaded at any appropriate terminal or other approved device connected to the central processing center by a network, and the card can be used to make purchases, withdraw cash, or receive services at any terminal or merchant which can connect to the central processing center ("network terminal"). Network terminals include point-of-sale ("POS") terminals within retail establishments, ATMs affiliated with financial institutions, and terminals or other devices operated by card issuers or their authorized agents. Thus, the card is well suited for many specific market needs including use while traveling at home or abroad. Fifth, because the card is reloadable, there is no need to worry about not having enough value on the card or being inconvenienced by having to acquire a new card when the balance in the account is depleted. Finally, use of the card is immediate, much like a cash card. However, unlike a cash card, the cash value does not actually reside on the card, but is recorded in the card processing center database connected to the network terminals. Thus the card is more secure than a cash card because a PIN or verified signature may be required in order to use it. If the card user loses the card, not only can the card not be used by anyone else, but the card user may be able to recover the value on the card.

The card can also be used in place of existing prepaid telephone cards. Unlike those cards, the PIN associated with this card is not written on the card and the cards are not activated before they are shipped, so if the card is lost or stolen, no one else will be able to use it. In addition, because the PIN is chosen by the card user, the card user will not easily forget it, unlike the situation with preassigned PINs. This prepaid card can be bought in any denomination and is reloadable, so that one who uses it to make a telephone call will not be limited to purchasing a new card when the initial account balance is depleted. Like existing cards, this card may be sold at a wide variety of retail establishments, but, unlike existing cards, this card can be reloaded at any location housing the appropriate terminal software, or via any approved device. One card may be used for more than just the purchase of telephone services.

The use of the card is not limited to one specific service. Because the card facilitates the safe storage of monetary value, it acts like a temporary bank deposit account, without the hassle of carrying or writing checks or going to the bank to make withdrawals. This aspect is useful, especially because many major metropolitan banks require either high minimum balances or high service fees to maintain individual checking or savings accounts. In addition, such a card is valuable to those who may be averse to credit cards or who are not eligible for them.

This card is valuable to businesses, too. Consumer, employee, or business partner use of the card increases efficiency, potentially lowering costs. These types of uses can improve tracking of card usage as compared with the current mode of tracking using checks, coupons, and other types of paper-based incentives.

One of the uses for this prepaid card is in payroll fulfillment. Instead of receiving a paycheck or Direct Deposit, an employer deposits the employee's pay to a prepaid card account. The employee has immediate access to his or her pay, either via an ATM or at approved merchants, does not have to cash a check, does not need a separate, individual bank account to take advantage of the convenience of Direct Deposit, and does not have to carry a large amount of cash after cashing a paycheck. Payroll fulfillment using the prepaid card is advantageous in all countries because not all residents have bank accounts. It is also advantageous to companies with either temporary workers or a mobile workforce.

A payroll embodiment operates as follows. Initially, the employer activates a set of cards by transmitting to the card processing center, via the issuing bank, the card numbers and PINs that the employer or issuer assigns to those cards. The employer distributes the cards to the employees and separately notifies each of them of the system-assigned PIN. The employees can then select a new, easily remembered PIN by sending the new PIN information to the central processing center via a terminal. When payday arrives, the employer transfers the appropriate amount of money to the designated account and provides information regarding allocation of these funds by the employee. The cards are then ready for immediate use, and can be used for making purchases, cash withdrawals, and, potentially, telephone calls, etc. The employee can add value to the card account with other funds, if desired. When the next payday arrives, the employer again deposits the appropriate amount of money to each card account, and the cycle resumes.

There are at least two different ways of activating a card—"individual" and "batch" activation. Individual activation, also called "terminal" or "agent" activation, includes a single user purchasing a card from an issuer or designated issuer agent or receiving a card from a program sponsor, the card user selecting a PIN, the issuer or agent transmitting to the processing center the card number, the PIN, and the amount of value to be associated with the card, and the processing center setting up a card and account file for that card number and recording the PIN and the amount of value associated with the card. (If transaction or processing fees are deducted, the value associated with the card will be less than the amount for which the card was purchased.) Instead of the user activating the card, it is also possible for an issuer to activate the card on the card user's behalf Optionally, instead of the processing center setting up the complete card and account file, the processing center can transfer, all or a portion of the transmitted data (the card number, PIN, and amount of value to be associated with the card) to a third party. This may happen in the case of a card that facilitates the use of stored monetary value as well as stored telephone units. The card is immediately ready for use.

In batch activation, of which payroll fulfillment is an example, the issuer or card program sponsor transmits to the processing center, via the issuing bank, a file including at least card numbers, system-assigned PINs, and initial value to be loaded, the processing center sets up a card and account file for each card number and records the associated PIN. The issuer or program sponsor then distributes the cards and notifies the card recipients of the system-assigned PINs, and each recipient is then able to change the PIN to one that is more familiar. Once that occurs, the cards may immediately be used by the recipients.

In addition to activating a card using these two methods, other functions can be performed on either an individual or a batch basis. The PIN can be changed, the card account can be reloaded, either by the card user or on the card user's behalf, purchases can be made, and the account can be closed. However, withdrawing cash and selecting a PIN can only be performed on an individual basis.

The card can be used in additional ways. One way is that the card can be used as a gift. A donor places value on the card, selects a PIN, gives the card to the recipient who is able to change the PIN to one more easily remembered, and then uses the card anywhere it is accepted. Because of the PIN, the gift card is safer than giving cash, both while sending the card and while the recipient holds the card, and the card's use is more immediate than a check.

Another example is in a commercial promotion where a product company or retailer wants to promote a product. The promoter batch activates a set of cards having a fixed value and distributes them by a variety of means to customers who purchase the promotional product. The customers use the cash value associated with the card, and then the promoter closes the card accounts.

In a further example of commercial promotion, instead of all customers receiving cards with the same value, only some of the cards are provided with value in their accounts, and those card accounts can have a range of variable value (e.g., five cards have $20 and two cards have $100). Thus, only some customers "win" and receive cards having accounts with a positive value. The winners use the cash value associated with the card, and the promoter closes the card accounts.

The card can also be used to transfer money, much as a wire transfer is accomplished today. A transferor adds value to a card account, and a second card having access to the same account is delivered to the transferee, perhaps in a different country. After the transferee learns of the PIN from the transferor, the transferee is then also able to access the value in the card account.

Another use for the card is to facilitate spending for corporate relocation expenses for either new or transferred employees. In this scenario, an employer loads value into a card account and gives the card to the employee who selects a PIN. The employee then uses the card for relocation expenses such as meals, gas, etc. If the value is depleted, the employer is able to load more value into the card account. The employer is also able to select in which merchant categories the employee will be able to use the card to purchase goods or services.

The system and method will now be described in more detail with reference to the figures. A system using a prepaid card, illustrated in FIG. 1, includes card 100, card user 10, card issuer 102, sales agent 104, terminal 106, and prepaid card processing center 110. The terms "card user," "cardholder," and "card recipient" are used interchangeably. Issuer 102, which may be a bank, issues card 100 and provides it to agent 104 having terminal 106 connected to processing center 110. Agent 104 can also be an employer, a telephone services provider, or any commercial establishment. Either issuer 102 or agent 104 can sell or distribute card 100 to card users 10. Card 100 can be obtained by card user 10 at a standalone terminal, as indicated by the dashed arrow in FIG. 1, or by some other means (e.g., mail) if batch activated. Terminal 106 can be a POS terminal, a standalone terminal, an ATM, or some other approved device. Processing center 110 is connected to terminals 106 preferably located all over the world via connection 108 which can be a telephone/modem connection or a communications network connection. Processing center 110 stores the card account number, PIN, and card account balance, thus activating the card for use. Processing center 110 can be implemented by one or more computer systems which include a database or memory for storing data. Issuer 102, which holds the funds corresponding to the amount on the prepaid card, is connected to processing center 110 via connection 112. Like connection 108, connection 112 can be a telephone/modem connection or any communications network connection. It is also possible that connections 108, 112 are part of one network connecting to terminals 106, processing center 110, and issuers 102.

Figure 2:
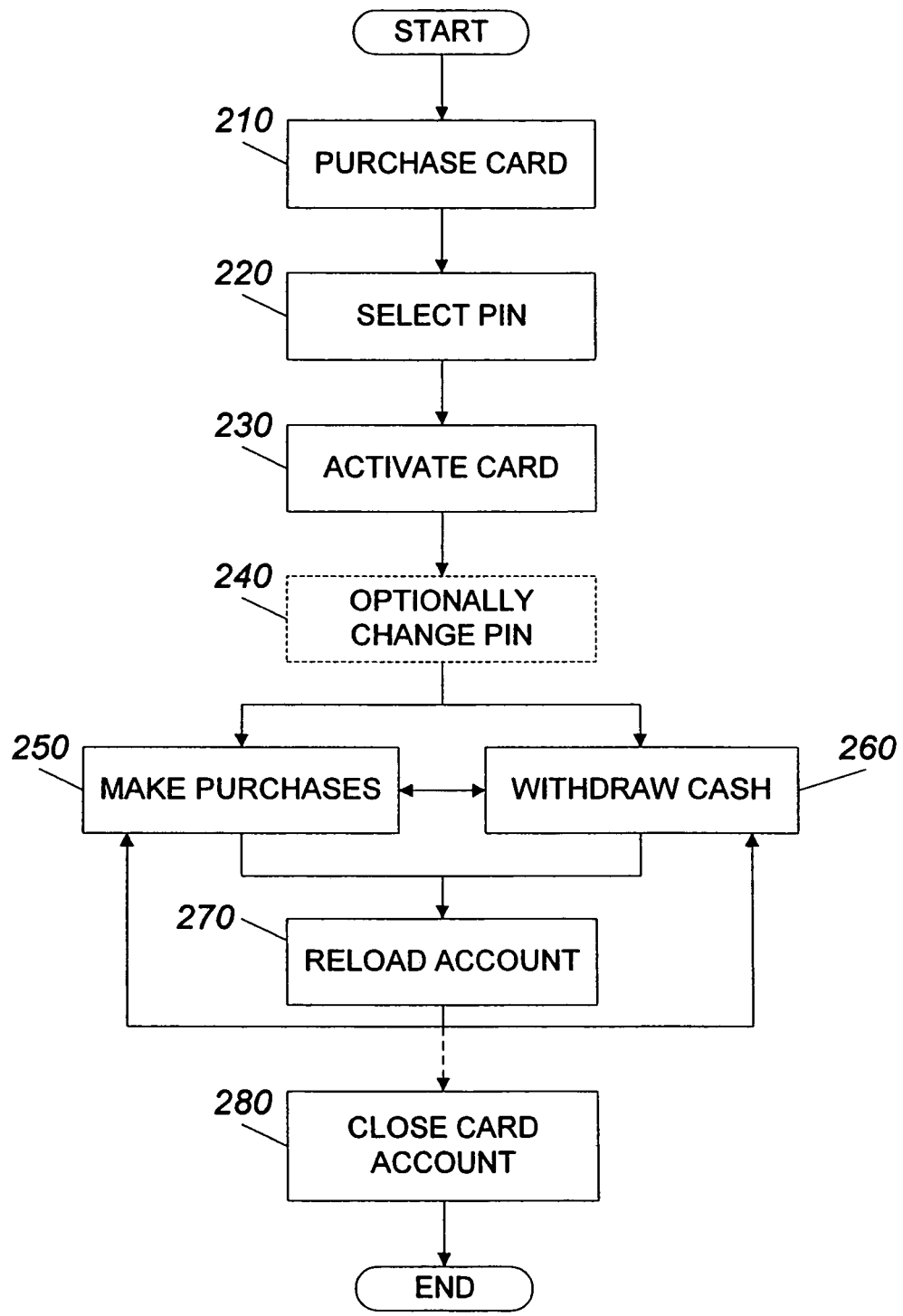
FIG. 2 is a flowchart illustrating a process for using a prepaid card in accordance with the invention.

The individual card activation and use process is illustrated in the flowchart in FIG. 2. Card user 10 desires to purchase or acquire a prepaid card 100 to make purchases or withdraw cash. In step 210, card user 10 purchases a card by providing payment in cash, check, credit, or debit form to agent 104 who operates an establishment in which terminal 106 is located. Terminal 106 is connected to processing center 110. In step 220, card user 10 selects a PIN which is transmitted to card processing center 110 via terminal 106. In step 230, agent 104 begins the activation process by transmitting to processing center 110 the card account number, PIN, and the amount of money paid by card user 10. Processing center 110 stores in an account in a database the card number, the amount paid, and the PIN, thus activating the card. Processing center 110, or, alternatively, agent 104, may deduct transaction or processing fees, in which case something less than the full value of the payment will be added to the card account. Once card 100 is activated, step 240 shows that card user 10 has the option of changing the PIN at any time using any terminal 106. In step 250, card user 10 uses the card to make a variety of purchases at different merchants, and, in step 260, the card user optionally uses the card to withdraw cash. Steps 250 and 260 decrease the balance in the card account. As purchases and cash withdrawals are made, the amount spent will be reconciled via, for example, clearinghouses, settlement systems, and the issuing bank. If the balance in the card account drops to zero or below some level at which card user 10 wants to add value, step 270 allows card user 10 to add value to the card at any terminal 106, including the terminal at which card user 10 bought the card. Step 270 can be performed any number of times, and then the card user can make additional purchases and cash withdrawals. Although not necessary, card user 10 has the option of closing the card account in step 280, which also includes refunding the balance remaining in the card account.

Figure 3A:
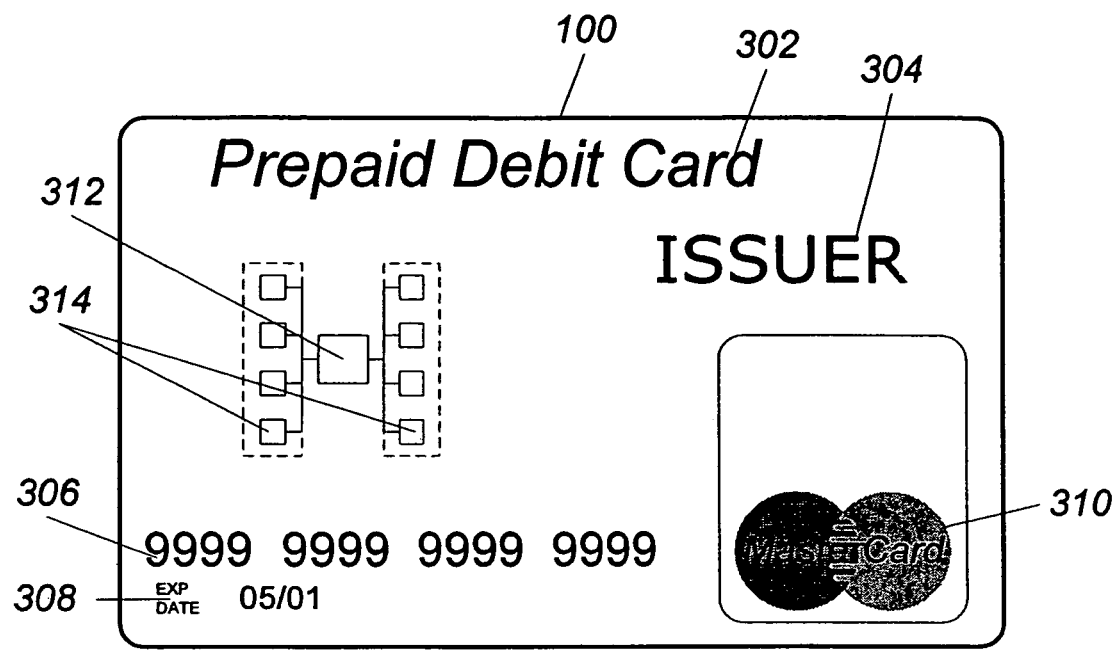
FIG. 3a illustrates a financial transaction card incorporating integrated circuit technology and used as a prepaid card.

Card 100, as illustrated in FIG. 3a, may incorporate IC technology that can be used with the presently claimed invention. Card 100 looks similar to a conventional magnetic stripe card, but also includes IC 312, which contains a microprocessor and memory, and electrical contacts 314 for communicating between IC 312 and devices external to card 100.

Similar to the conventional card, the front side of card 100 preferably identifies the card as a "Prepaid Debit Card" 302, contains issuer 102's name 304, card user 10's card number 306, and the logo 310 of financial services (e.g., MasterCard®) accessed by the card. There may be more than one logo 310 that appears on the card or the card may appear unbranded. Other financial services accessible with the card can include, for example, Maestro® POS purchase services and Cirrus® ATM services. In some cases, card 100 may include an expiration date 308. It is noteworthy that card 100 does not necessarily include card user 10's name.

Figure 3B:
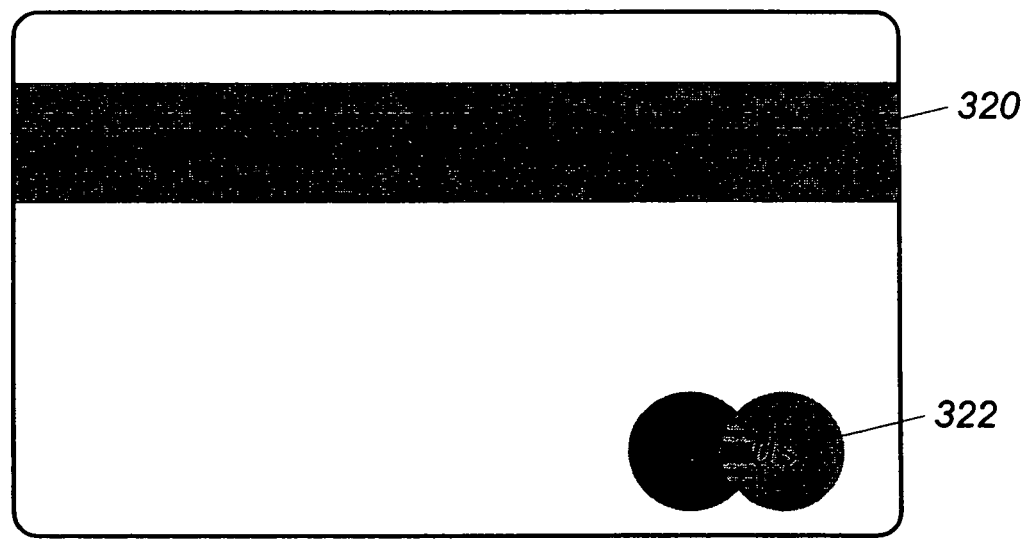

FIG. 3b shows the back of card 100 upon which magnetic stripe 320 is attached. Logo 322, for example, may also appear on the back of the card. Magnetic stripe 320 may be used in place of, or in addition to, integrated circuit 312. Magnetic stripe 320 stores information such as card number 306 and includes information that, when agent 104 swipes magnetic stripe 320 through terminal 106, enables the terminal to connect to processing center 110 via modem or some other approved communications method. Alternatively, card number 306 and the PIN can be stored within a memory module located in IC section 312.

Figure 3C:
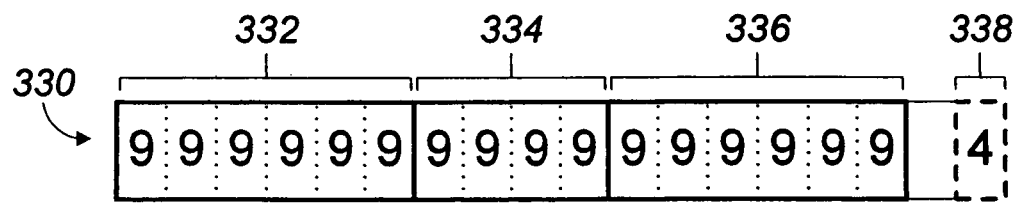
FIG. 3c is a schematic of the account number associated with the card illustrated in FIGS. 3a and 3b and kept in the processing center files.

FIG. 3c depicts account number 330 which is stored on magnetic stripe 320. Account number 330 may total from 16 to 19 digits—as shown in FIG. 3c, account number 330 totals 17 digits. The first six digits 332 comprise the "BIN" which identifies card 100 as a prepaid card. The next four digits 334 comprise the "plan ID" which is assigned to issuer 102. This number facilitates identifying the location of funds associated with the prepaid card so that reconciliation and reporting can occur. The next five to eight digits 336 comprise the number of the account in which the balance associated with the card is stored. The final digit 338 comprises a check digit to verify the other 15-18 digits. The data stored on magnetic stripe 320 or IC 312 can be encrypted to enhance security.

Figure 4:
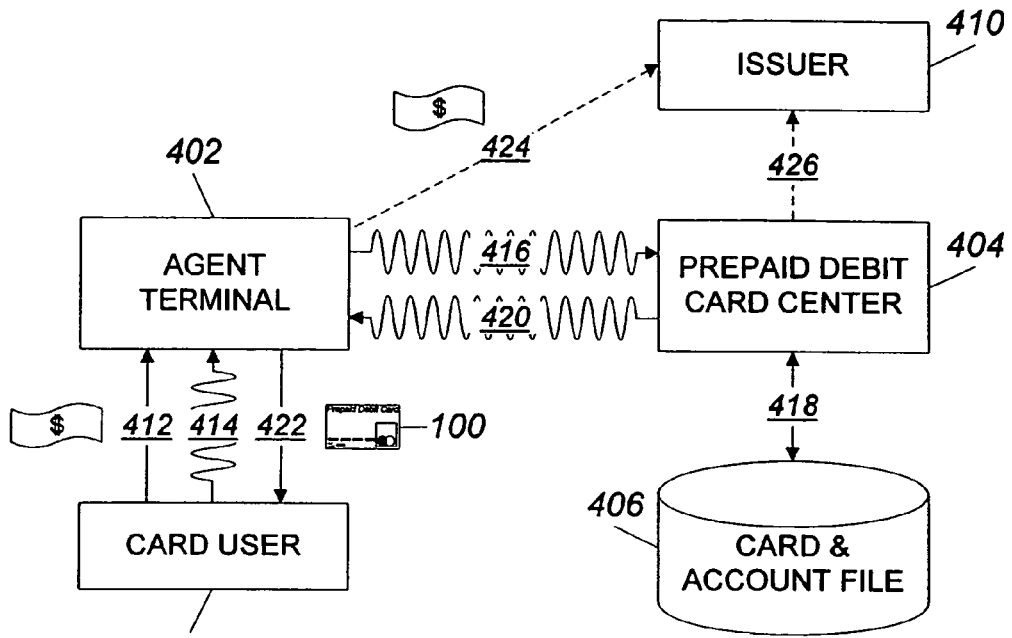
FIG. 4 is a block diagram illustrating a process of purchasing and activating a prepaid card in accordance with the invention.

FIG. 4 shows a block diagram illustrating the initial steps—purchase and activation of the card and PIN selection—associated with the process depicted in FIG. 2. FIG. 4 shows card user 10, agent terminal 402, prepaid debit card center ("PDC") 404, card & account file 406, and issuer 410. Agent terminal 402 is preferably a terminal operated by a merchant, but it could also be operated directly by issuer 102, or it could be an ATM or some other approved device. Card & account file 406 is made up of a Card File and an Account File. The Card File keeps track of the cards that are in use (i.e., for which PINs have been selected) and are still open, how much value is in each card account, and the PIN for that card. The Account file keeps track of the amount of money available in each account in the Card File for each issuer for later reconciliation purposes.

Initially, in step 412, card user 10 provides payment in cash, check, credit, or debit form to agent 104. An indication of the value of the payment is placed in the account for card 100. The PDC may deduct some transaction or processing fees, and an indication of the payment less the fees will be placed in the account for card 100. In step 414, card user 10 inputs to agent terminal 402 a PIN of his or her choosing. In step 416, agent terminal 402 transmits to PDC 404 over a communications network (including, for example, a direct connection, the Internet, a modem, etc.) the card account number, PIN, value to be placed in the card account, and a transaction code, in this case "new." In step 418, PDC 404 adds the card number to the Card File, along with the PIN and the value placed in the card account, and adds the card value to the Account file. In step 420, if the card number is valid and all other issuer-specified criteria have been met, PDC 404 transmits a message to agent terminal 402 that the card has been activated. In step 422, agent 104 gives active card 100 to card user 10, and card 100 is ready for use.

The process described above is preferably performed in real-time. However, two more steps do not have to be performed in real-time and are preferably performed only about once a day. In step 424, agent 104 deposits with issuer 410 the money received from all card users 10. In step 426, PDC 404 transmits to issuer 410 over the communications network the net result of new value placed in card & account file 406 for the cards associated with that particular issuer and any decrements to those accounts as a result of purchases, withdrawals, reloads, and fees.

As compared with the "agent" or "terminal" activation depicted in FIG. 4, which activates one account at a time, more than one prepaid card account can be set up and activated at once in a process called "batch activation," which typically involves a program sponsor. A flowchart of a process of the invention including batch activation is illustrated in FIG. 5a. Initially, the program sponsor records the card number associated with each recipient and, in step 502, assigns a PIN (or has a PIN assigned) to each card number. In step 504, the program sponsor via the PDC activates the cards by transmitting to the PDC via the issuer the card number, PIN, and value added to each card account. In step 506, the program sponsor distributes each card and, with the card or separately, transmits (via mail, electronic means, or other means) the assigned PIN to the recipient. The program sponsor can set an effective date from which the card may be used. Once the card and PIN are received, in step 508, the recipient has the option to change the PIN to one that can be more easily remembered. This can be done by calling a customer service number or changing the PIN at an agent terminal, at an ATM, or through an IVRU or some other approved device. After the effective date, the recipient can use the card in the same manner as any prepaid card, allowing card user 10 in step 510 to make purchases or withdraw cash. In step 512, card user 10 can reload the card account just as was done earlier in step 270. At any regular or variable interval, as indicated in step 514, the program sponsor reloads the card account by adding value to it, and the card can again be used immediately by card user 10. The program sponsor has the option of closing the card account in step 516, which also includes refunding the balance of value remaining in the card account.

Figure 5B:
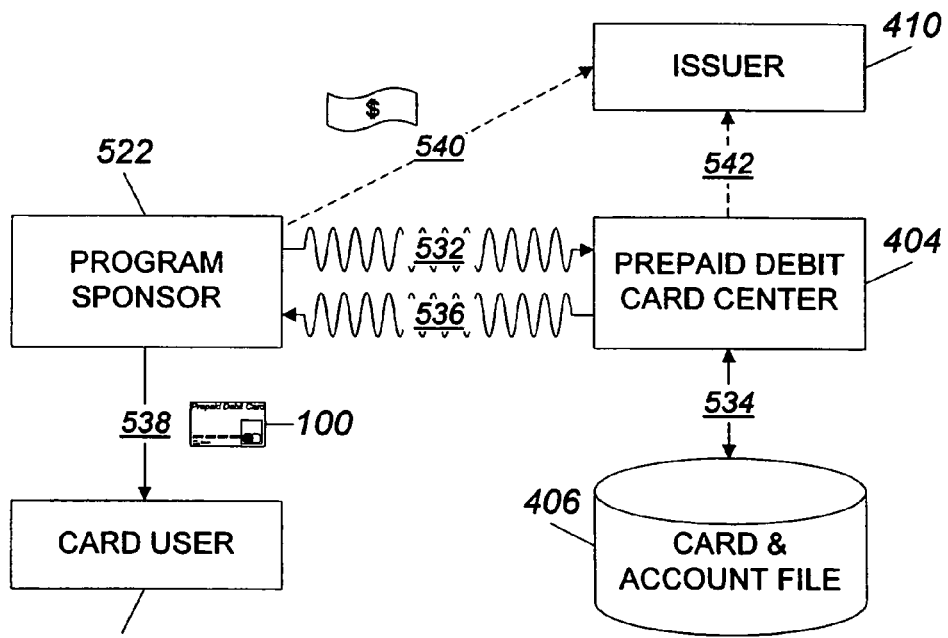
FIG. 5b is a block diagram illustrating a process for batch activating a number of prepaid cards in accordance with an embodiment of the invention.
Figure 5A:
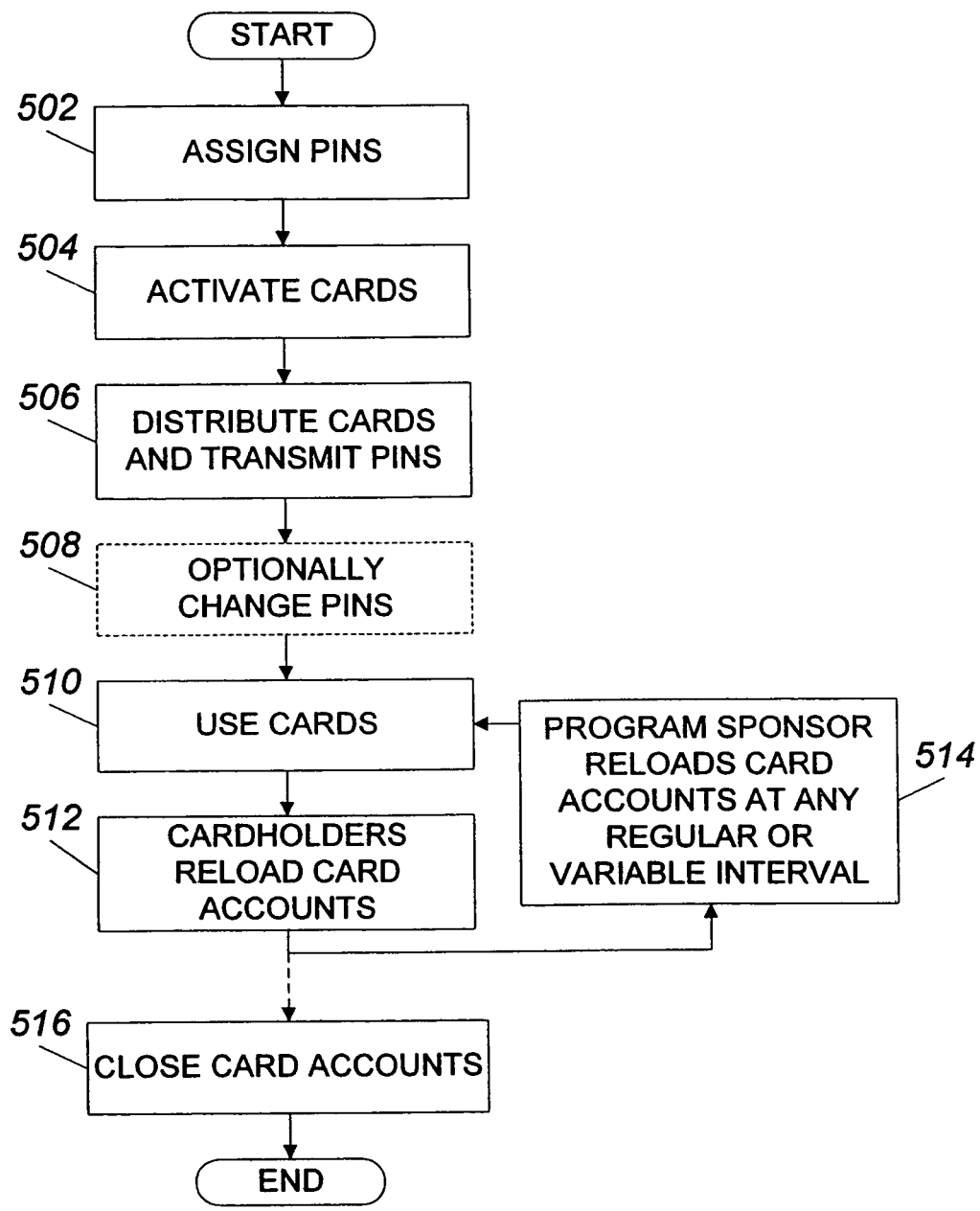
FIG. 5a is a flowchart illustrating a process for using prepaid cards that have been batch activated in accordance with an embodiment of the invention.

FIG. 5b is a block diagram illustrating the initial steps of the batch activation flowchart of FIG. 5a. FIG. 5b includes the same elements as terminal activation in FIG. 4 except that agent terminal 402 is replaced by program sponsor 522. Alternatively, program sponsor 522 could be represented by issuer 102. In step 532 of batch activation, program sponsor 522 transmits to PDC 404 a batch file that includes the card account number, the effective date, the amount to be loaded into the card account, a transaction code (i.e., "new"), and a system-assigned PIN. As with terminal activation, in step 534, PDC 404 adds the card number to the Card File, along with the PIN and the value placed in the card account, and adds the card value to the Account file. Step 534 is repeated for each card included in the batch file. When the processing is complete, in step 536, PDC 404 transmits to program sponsor 522 that the card accounts have been activated. In step 538, program sponsor 522 sends to card user 10 card 100 and, with the card or separately, transmits (via mail, electronic means, or other means) a PIN to the cardholder. As was shown in step 508 in FIG. 5a, after the card and the system-assigned PIN are received, the cardholder has the option to call a customer service number to change the PIN to one that is more easily remembered, or can change the PIN at an agent terminal, at an ATM, or through an IVRU or other approved device.

Two more steps are required to complete the process. These steps may be performed at the same time the batch activation is performed or at a regular interval. In step 540, program sponsor 522 transfers money to issuer 410, covering the aggregate amount loaded into the Card File. In step 542, PDC 404 accounts to issuer 410 the new value loaded in card & account file 406. After the effective date, the card can be used for making purchases or withdrawing cash.

Figure 6A:
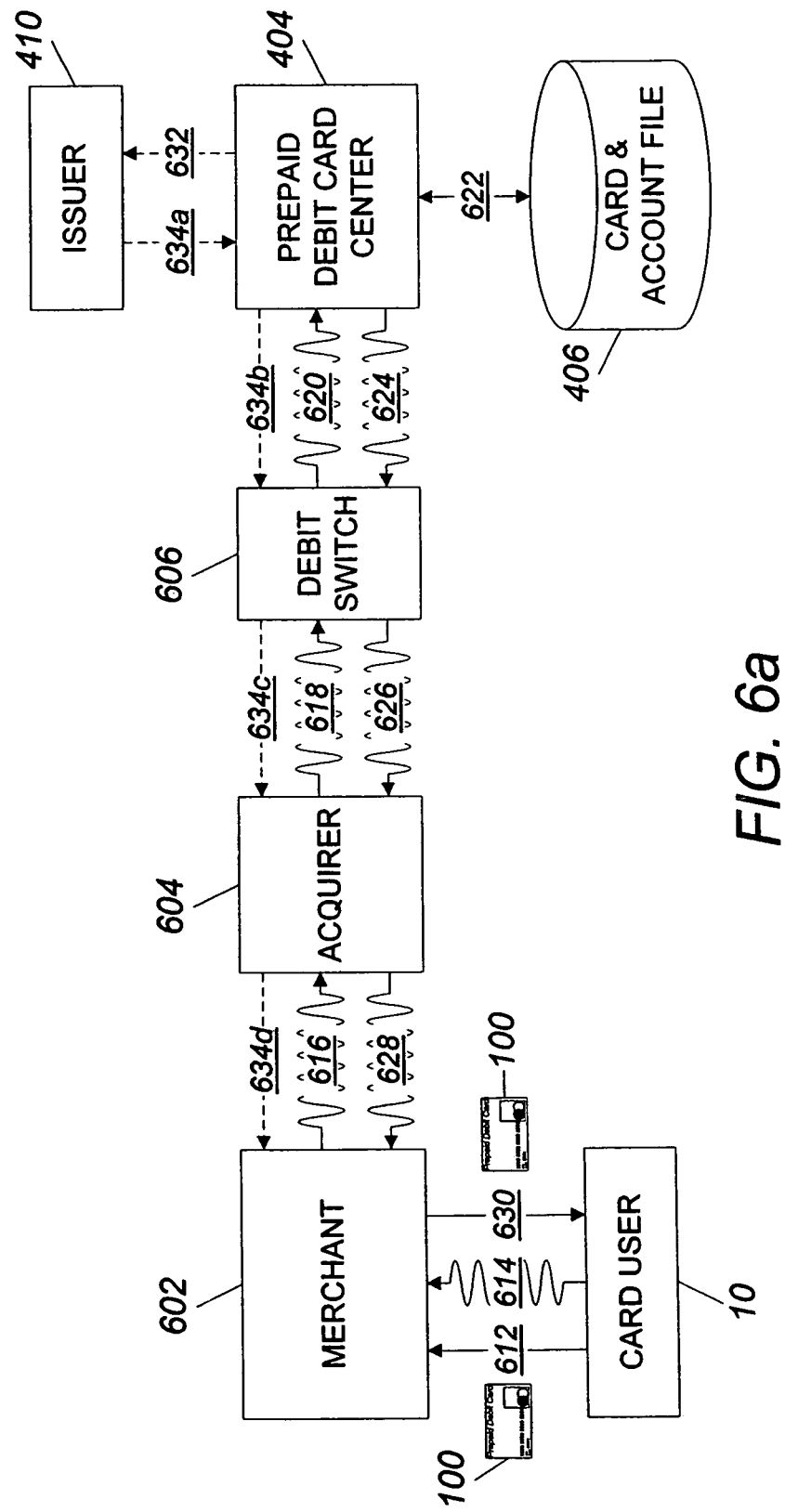
FIG. 6a is a block diagram illustrating a process of using a prepaid card to purchase products or services in accordance with the invention.
Figure 6B:
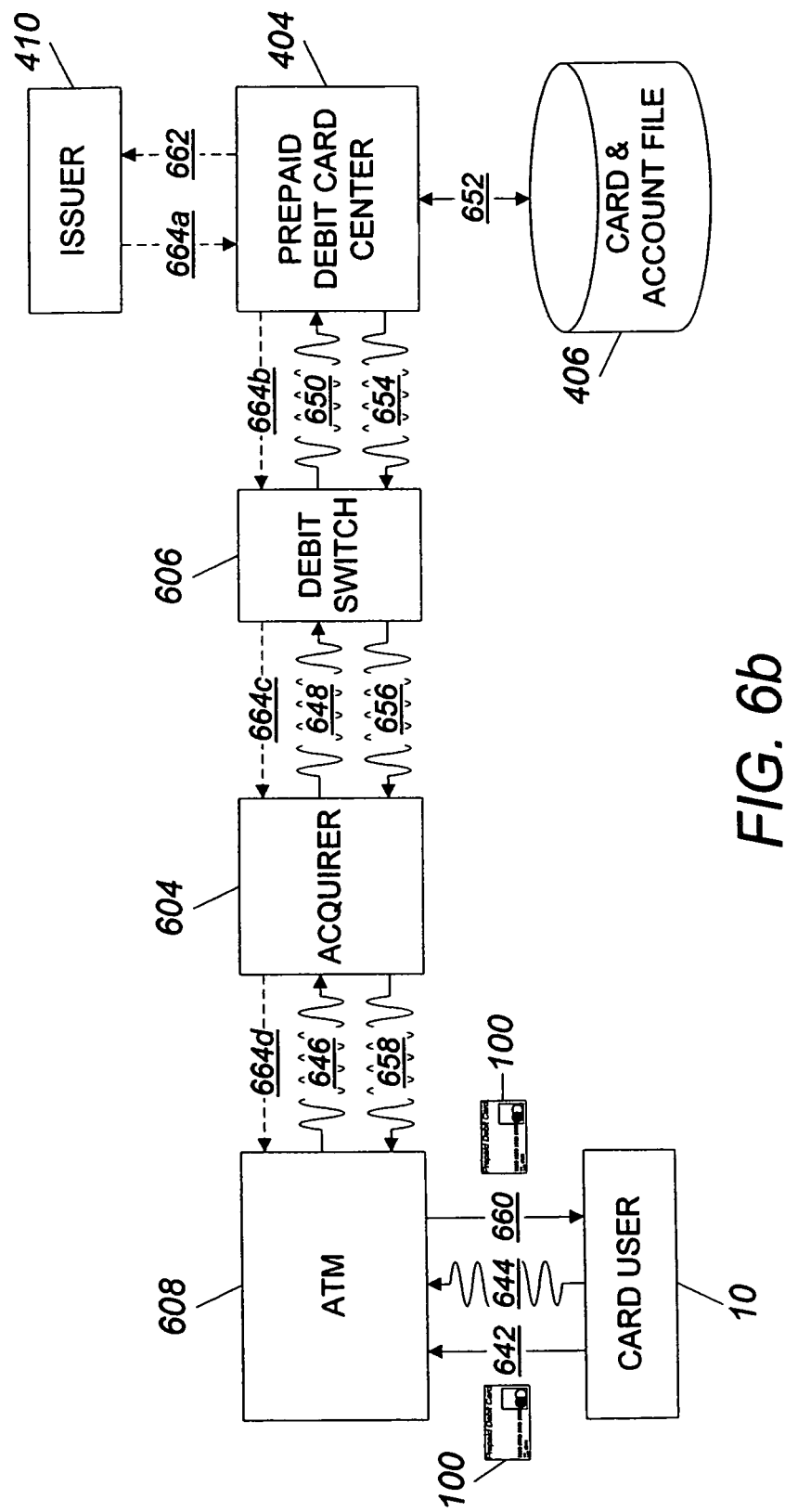
FIG. 6b is a block diagram illustrating a process of using a prepaid card to withdraw cash in accordance with the invention.

Block diagrams illustrating the processes of making purchases and withdrawing cash are shown in FIGS. 6a and 6b, respectively. The block diagram in FIG. 6a includes most of the same elements as the terminal activation depicted in FIG. 4 with a few exceptions. First, agent terminal 402 is replaced by merchant 602 which may be made up of a cashier and a POS terminal, a customer service representative and an ordering system, or some other similar combination. Second, a debit switch 606 is included that controls the transmission of data messages between merchant 602 and PDC 404. An example of a debit switch is the MasterCard® Debit Switch. Third, acquirer 604, which acts as a facilitator for transaction processing and settlement, is interposed between merchant 602 and debit switch 606.

Initially, in FIG. 6a, card user 10 preferably chooses goods or services from a merchant and, in step 612, presents or identifies the item or service and card 100 to the merchant who swipes the card and inputs the price of the item or service. In step 614, card user 10 inputs the PIN to the POS terminal, and, in steps 616, 618, and 620, the POS terminal transmits to PDC 404 via acquirer 604 and debit switch 606 the card number, PIN, price of the item or service, and transaction code (i.e., "purchase item"). In step 622, PDC 404 checks the Card File to verify that the PIN matches, checks the card account balance to verify that it can cover the purchase, and checks the transaction against all other issuer- or PDC-specified criteria. If these steps are confirmed, PDC 404 decrements by the amount of the purchase both the card account balance and the Account File, and, in steps 624, 626, and 628, sends an approval to the POS terminal via debit switch 606 and acquirer 604. Once approval is received, in step 630, the merchant returns card 100 and gives the item to card user 10. If approval is not given, the transaction is denied.

The process described in FIG. 6a is preferably performed in real-time. In addition, several more steps do not have to be performed in real-time and are preferably performed only about once a day. In step 632, PDC 404 accounts to issuer 410 the value taken from all the issuer's cards 100 used that day. In steps 634a, 634b, 634c, and 634d, issuer 410 settles with PDC 404, which in turn settles with debit switch 606, which in turn settles for all relevant transactions with acquirer 604, which in turn settles with merchant 602, from which the purchases were made.

The process of withdrawing cash, illustrated in FIG. 6b, is similar to that of making a purchase, and the block diagram in FIG. 6b includes the same elements as those used to make a purchase except that merchant 602 is replaced by ATM 608. Although using an ATM is preferable, a possible alternative to effect a cash withdrawal is with a POS terminal in a retail store or at an agent terminal. In step 642, card user 10 inserts card 100 into ATM 608 and requests a withdrawal of some amount of cash, and, in step 644, inputs the PIN to ATM 608. In steps 646, 648, and 650, ATM 608 transmits to PDC 404 via acquirer 604 and debit switch 606 the card number, PIN, amount of cash desired, minus any transaction fees, and the transaction code (i.e., "withdrawal"). In step 652, PDC 404 checks the Card File to verify that the PIN matches and checks the card account balance to verify there that is enough value to cover the withdrawal and checks against all other issuer- or PDC-specified criteria. If these steps are confirmed, PDC 404 decrements by the amount of the withdrawal and applicable fees, if any, the card account balance and the Account File, and, in steps 654, 656, and 658, sends an approval to ATM 608 via debit switch 606 and acquirer 604. Once approval is received, in step 660, ATM 608 dispenses the money to card user 10. If approval is not given, the transaction is denied.

As with the other processes, this process is preferably performed in real-time. In addition, as in FIG. 6a, steps involving settlement do not have to be performed in real-time and are preferably performed only about once a day. In step 662, PDC 404 accounts to issuer 410 the value taken from all the issuer's cards 100 used that day. In steps 664a, 664b, 664c, and 664d, issuer 410 settles with PDC 404, which in turn settles with debit switch 606, which in turn settles for all relevant transactions with acquirer 604, which in turn settles with the owner of ATM 608, from which the withdrawals were made.

Figure 7A:
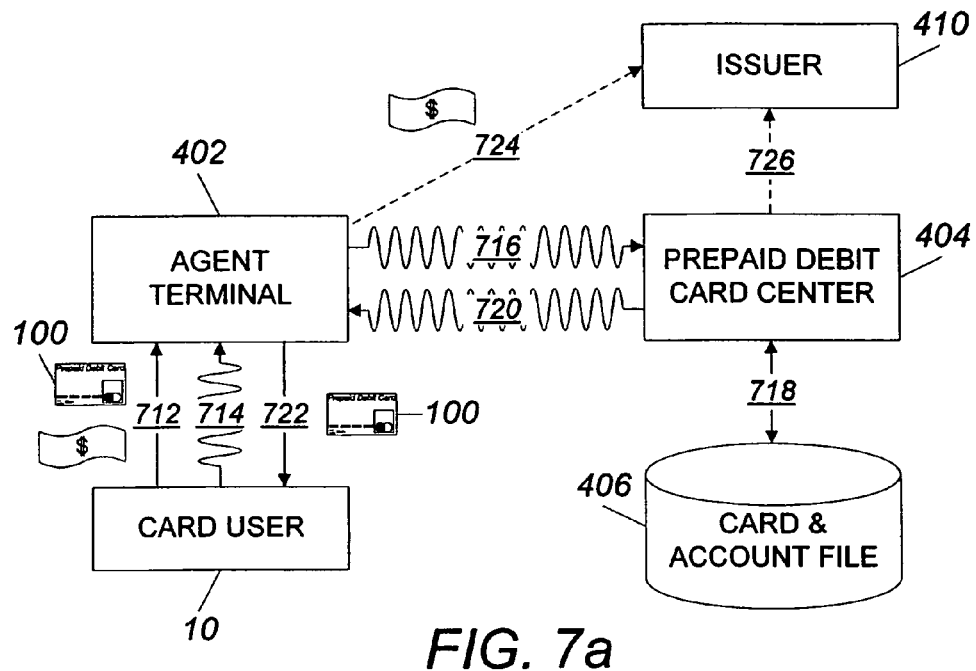
FIG. 7a is a block diagram illustrating a process of adding value to a prepaid card account in accordance with the invention.
Figure 7B:
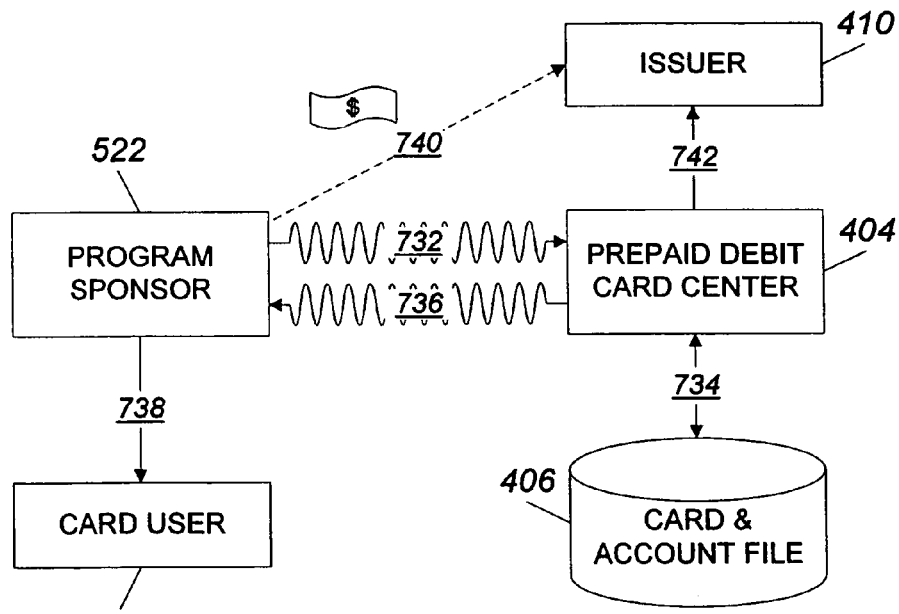
FIG. 7b is a block diagram illustrating a process for batch loading prepaid card accounts in accordance with the invention.

After using card 100 to make purchases or withdrawals, a card user may want to add value to the card account. Reloading may be done on either a single-card or a batch basis, and is similar to the activation of a card illustrated in FIGS. 4 and 5b. FIGS. 7a and 7b illustrate individual and batch reloading, respectively.

FIG. 7a includes the same elements as shown in FIG. 4. In step 712, card user 10 provides to agent 104 card 100 along with payment in cash, check, credit, or debit form. PDC 404, or, alternatively, the agent, may deduct transaction or processing fees, in which case something less than the full value of the payment will be added to the card account. In step 714, card user 10 inputs his or her PIN to agent terminal 402, and, in step 716, agent terminal 402 transmits to PDC 404 the card number, PIN, value to be placed in the account for card 100, and the transaction code, in this case "reload." In step 718, PDC 404 checks the Card File to verify that the PIN matches and that all other issuer- or PDC-specific criteria have been met and adds the reloaded value to the card account and to the Account file. In step 720, PDC 404 transmits to agent terminal 402 whether the transaction has been completed or denied and, if so, that the card account has been reloaded. In step 722, agent 104 gives back card 100 to card user 10, and card 100 is again ready for use.

As with terminal activation, this is preferably a real-time process. Steps 724 and 726 do not have to be performed in real-time and are preferably performed only about once a day. In step 724, the agent deposits with issuer 410 the money received from all card users 10. In step 726, PDC 404 accounts to issuer 410 the value added to the card & account file 406.

Batch reloading is similar to batch activation and includes the same elements as FIG. 5b. In step 732, program sponsor 522 transmits (either directly or through its issuer) to PDC 404 a batch file that includes the card number, the amount to be added to the card account, and the transaction code (i.e., "reload"). In step 734, PDC 404 adds the reloaded value to the card account and to the Account file. A PIN is not used nor needed in batch loading mode. Step 734 is repeated for each card included in the batch file. When the processing is complete, in step 736, PDC 404 transmits to program sponsor 522 or its issuer that the card accounts have been reloaded. In step 738, program sponsor 522 or its issuer notifies each cardholder that card 100 has been reloaded.

Either at the same time or at a regular interval, in step 740, program sponsor 522 transfers money to issuer 410, covering the aggregate amount added to the Card File. In step 742, PDC 404 accounts to issuer 410 the added value loaded in card & account file 406.

Figure 8A:
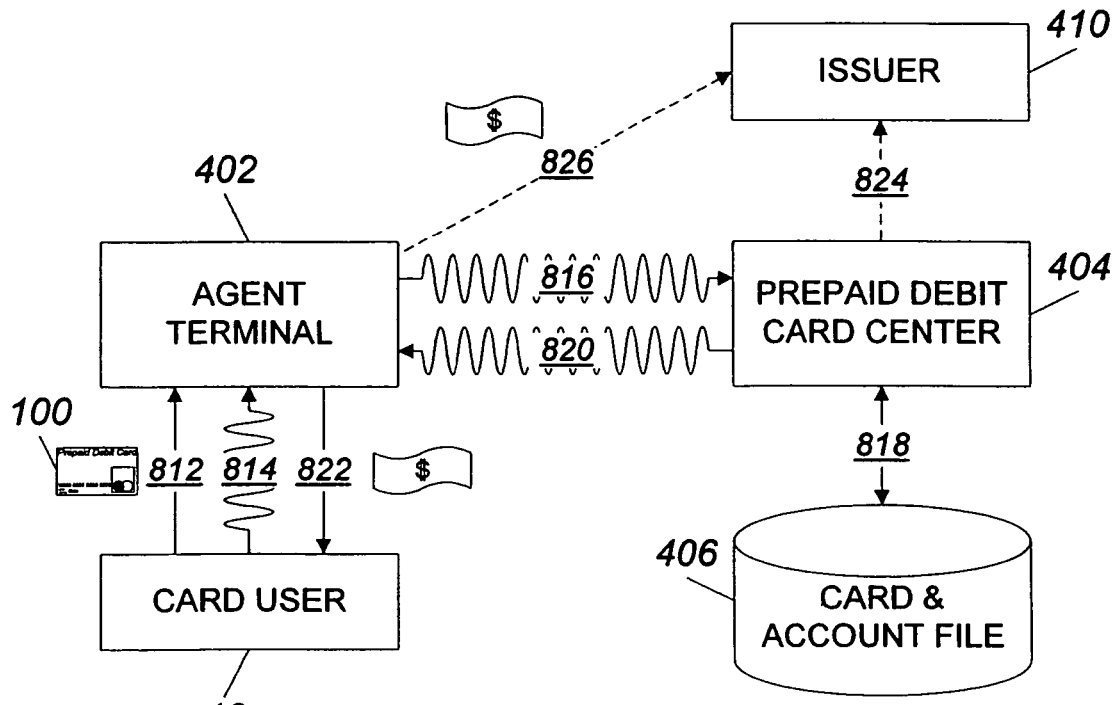
FIG. 8a is a block diagram illustrating a process of closing a prepaid card account in accordance with the invention.
Figure 8B:
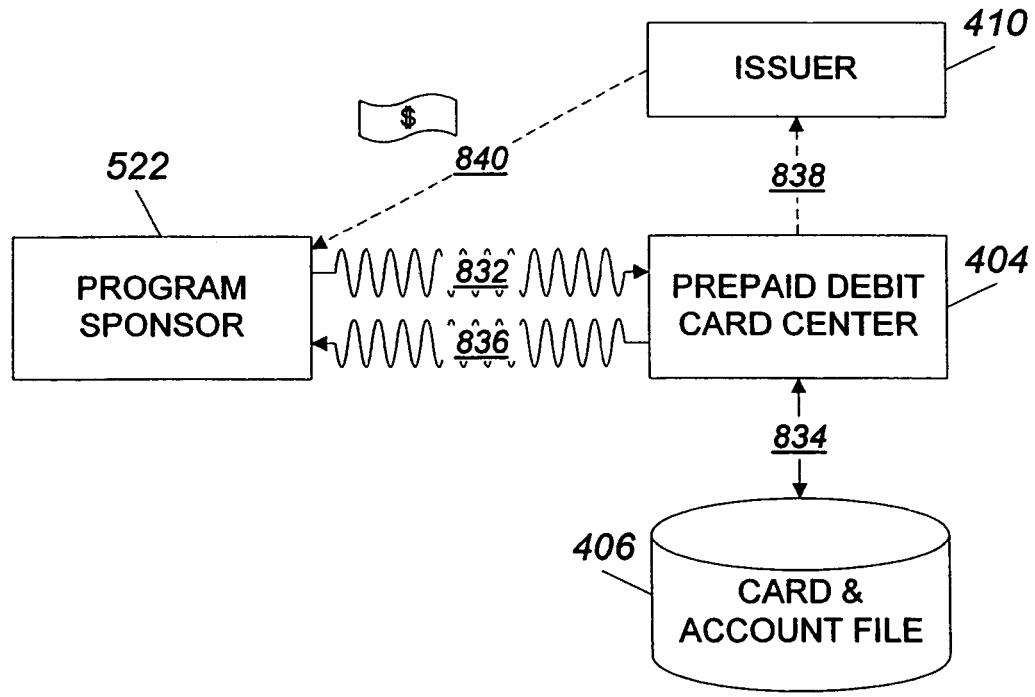
FIG. 8b is a block diagram illustrating a process of batch closing a number of prepaid card accounts at one time in accordance with the invention.

The final step associated with the main process in FIG. 2—the step of closing a card account—is illustrated in FIGS. 8a and 8b. FIG. 8a is a block diagram showing closing of an account for a single card, and FIG. 8b is a block diagram showing batch closing of a group of accounts.

The block diagram in FIG. 8a illustrates using card 100 to withdraw cash. Closing an account requires withdrawing all the value remaining in the account and then disabling the account and the card's access to that account. Closing of an account can be performed at an ATM, through an agent terminal, through some other approved device, or through issuer 102, although it is preferably performed at an agent terminal. In step 812, card user 10 presents card 100 to agent 104 and requests a closure of the account along with the refund of the rest of the funds in the account. In step 814, card user 10 inputs the PIN to agent terminal 402, and, in step 816, agent terminal 402 transmits the card number, PIN, and transaction code (i.e., "close") to PDC 404. In step 818, PDC 404 checks the Card File to verify that the PIN matches and that all other issuer- or PDC-specific criteria have been met and determines how much value remains in the account. When all required conditions are determined to have been met, PDC 404 sets the card account balance to zero and decrements the Account File by the amount of the refund, and, in step 820, transmits an approval and the amount of the refund to agent terminal 402. Once approval is received, in step 822, agent 104 gives the money to card user 10, minus any transaction fees. If approval is not given, the transaction is denied.

This process is preferably performed in real-time, but the steps involving issuer 410 are preferably performed only about once a day. In step 824, PDC 404 accounts to issuer 410 the value taken from all the card accounts closed that day. In step 826, agent 402 transfers the fees, if any, for all account closures at agent terminal 402 to issuer 410. In some cases, agent terminal 402 can be reimbursed by issuer 410.

FIG. 8b illustrates the process of batch or automatic closing of a group of accounts. This may occur when program sponsor 522 runs a promotion for a limited period of time and desires that the promotional cards expire at a preset date. In some scenarios, such as the payroll scenario, groups of employees may be terminated in which case an "expiration date" would not apply. Some time before the expiration date, in step 832, program sponsor 522 transmits a batch file to PDC 404 containing card number, expiration date, and transaction code (i.e., "batch close"). In step 834, PDC 404 determines how much value remains in the card number account. PDC 404 sets the card account balance to zero and decrements the Account File by the amount of the balance. Step 834 is repeated for each card number included in the batch file. When the processing is complete, in step 836, PDC 404 transmits to program sponsor 522 or its issuer that the card number accounts have been closed and indicates how much money remains in the account of program sponsor 522.

Either at the same time or at a regular interval, preferably about once a day, in step 838, PDC 404 accounts to issuer 410 the total value remaining in the account of program sponsor 522. In step 840, issuer 410 transmits an accounting of remaining funds to program sponsor 522 or its issuer.

In addition to using the prepaid card for making purchases at merchants, card user 10 can use card 100 to access telephone services. FIGS. 9a-9d are flowcharts illustrating the purchase, use, and reloading of a prepaid card used to access such services.

Figure 9A:
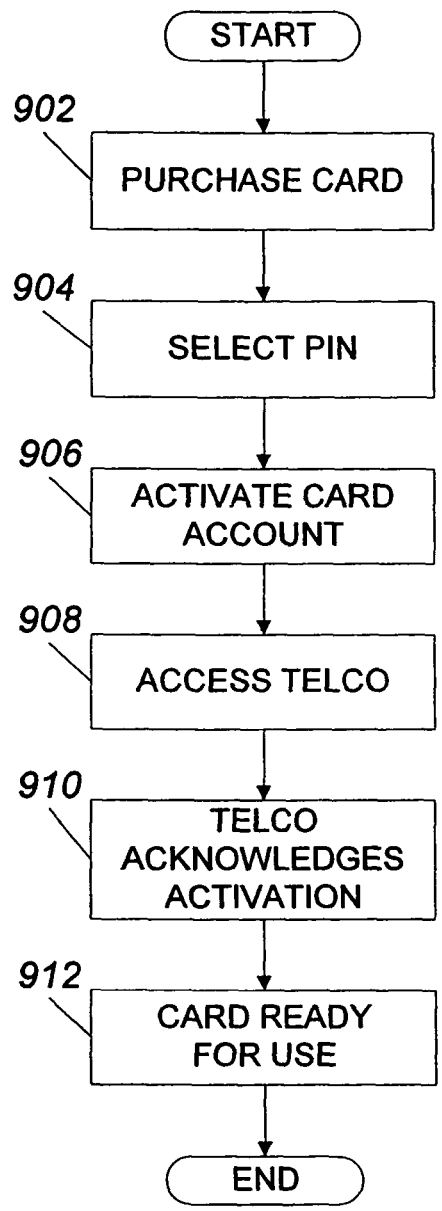
FIG. 9a is a flowchart illustrating a process of purchasing and activating a prepaid card used for purchasing telephone services in accordance with an embodiment of the invention.

FIG. 9a illustrates the processes of purchasing and activating the telephone card and selecting the PIN. In general, these processes work in a manner similar to those depicted in FIG. 4 and include card user 10, agent terminal 402, PDC 404, and a telephone services provider ("TELCO"). Initially, in step 902, card user 10 provides payment in the form of cash, check, credit, or debit to agent terminal 402 to purchase the card. In step 904, card user 10 selects a PIN and inputs it to terminal 106, and, in step 906, agent terminal 402 begins the activation process by transmitting to PDC 404 over the communications network the card number, PIN, value to be placed in the card account, and transaction code, in this case "new." In step 908, PDC 404 accesses the TELCO or program sponsor (for simplicity, only "TELCO" will be used). The TELCO adds the card number to its card file, along with the PIN selected by card user 10 and the value placed in the card account, and adds the card value to an account file. In step 910, the TELCO acknowledges to agent terminal 402 via PDC 404 that the requested transaction has been completed and that the card has been activated. In step 912, AGENT 402 gives an active prepaid telephone card to card user 10, and the card is ready for use.

Figure 9B:
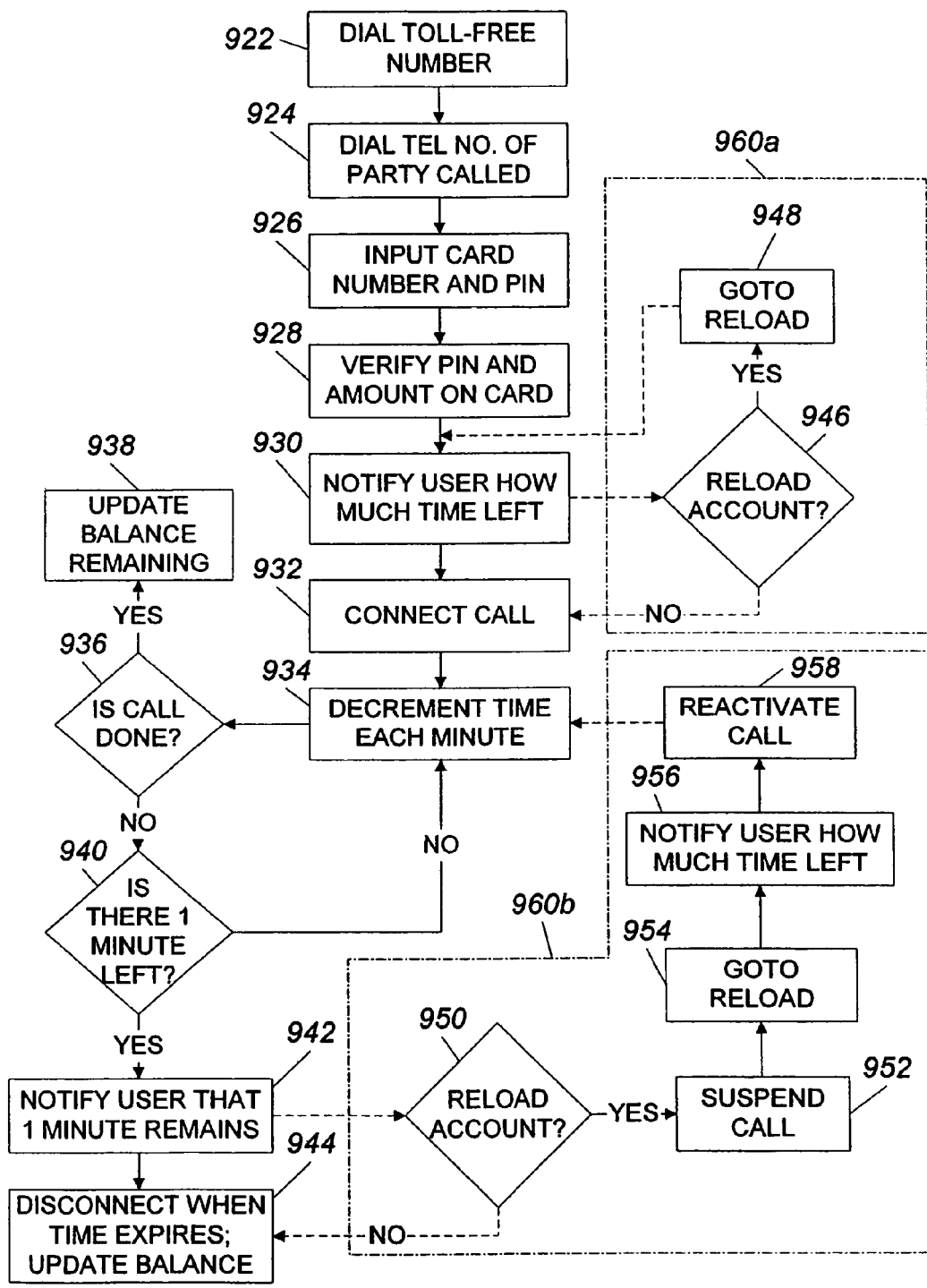
FIG. 9b is a flowchart illustrating the process of using a prepaid card to purchase telephone services in accordance with an embodiment of the invention.
Figure 9C:
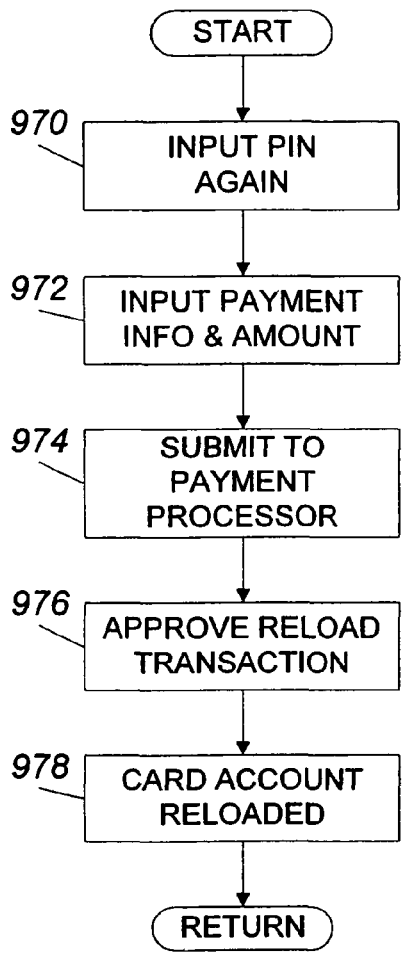
FIG. 9c is a flowchart illustrating a process of adding value to an account associated with a prepaid card used for purchasing telephone services in accordance with an embodiment of the invention.
Figure 9D:
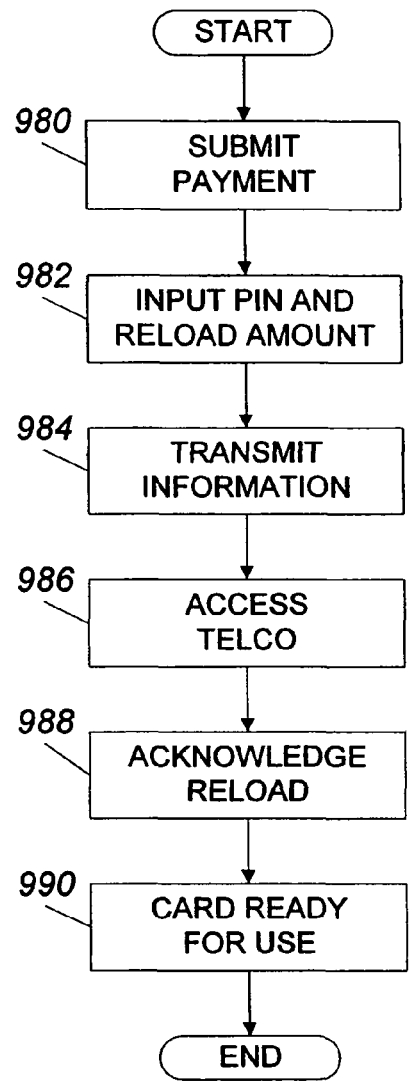
FIG. 9d is a flowchart illustrating another process of adding value to an account associated with a prepaid card used for purchasing telephone services in accordance with an embodiment of the invention.

FIG. 9b illustrates the processes of using the prepaid telephone card. In step 922, card user 10 dials, for example, a toll-free customer service number to connect to the TELCO. Once connected, in step 924, card user 10 dials the telephone number of the party to be called, and, in step 926, inputs to the telephone the card number and PIN. Alternatively, the card is inserted or swiped in a telephone and the cardholder enters his or her PIN. In step 928, the TELCO verifies that the card number and PIN are valid, and then retrieves how much value remains in the card account. By knowing the originating telephone number, the destination telephone number, and the value remaining in the card account, the TELCO determines how much phone time remains in the card account and, in step 930, notifies card user 10 how much time remains. In step 932, the TELCO connects the call.

During the call, step 934 keeps track of the length of the call and each unit of time, e.g., each minute, decrements the usage time by one unit. This time unit can be more or less than one minute, depending on the policies and the processing capability of the TELCO. Step 936 asks whether the call has been completed. If so, step 938 updates the remaining balance in the TELCO card and account file. If the call is not yet complete, step 940 asks whether there is only one minute of phone time left on the card. If not, the process loops back to step 934 to decrement the time when the next minute passes. But, if there is only one minute of phone time left, step 942 notifies the card user in the background of that fact, and step 944 disconnects the phone when the time expires and updates the TELCO card and account file to reflect a zero balance on the card.

This process illustrates using the prepaid telephone card without being able to reload the card account while on the telephone. However, the process can be modified to allow a card user to reload the prepaid card account while on the telephone, using a separate credit or debit card or other form of payment. Blocks 960a and 960b illustrate the steps included in this modification, describing, respectively, reloading the card before the phone call is made and reloading during the phone call. The dashed arrows indicate departures from the main process to incorporate this modification.

In step 930, the main process notifies the user how much time is left in the card account. At that point, step 946 then asks whether the card user wants to reload the card account, for example, if the card user anticipates a call longer than the remaining units of time determined by the TELCO. If the phone time remaining in the card account is sufficient and the card user does not want to reload the card account, step 932 connects the call. However, if the card user does want to reload the card account, step 948 calls a reload subroutine, illustrated in FIG. 9c, which reloads a prepaid card account using the separate credit or debit card.

The reload subroutine operates as follows. In step 970 in FIG. 9c, as a security measure, card user 10 inputs the PIN again. In step 972, the card user inputs using the telephone keys (or by swiping the card in the phone) the credit or debit card number that is to be used as the source of reload value and the amount of value he or she wants to add to the prepaid card account. In step 974, PDC 404 transmits the information to the appropriate payment processor and receives approval in step 976. In step 978, PDC 404 transmits to the TELCO the increase in value in the card account, the prepaid telephone card account is now reloaded, and the card user is returned to the process in FIG. 9b.

Once reloaded, step 930 is repeated in which the TELCO notifies the card user how much phone time remains in the card account. Step 946 again asks whether the card user wants to reload the card account, to which the card user might answer affirmatively, but most likely answers "no." In that case, in step 932, the TELCO connects the call. The call continues with the time decrement loop of the main process. However, when step 942 notifies the user that one minute remains, step 950 gives the card user the option of immediately reloading the card account. If the card user decides not to reload the card account, step 944 will disconnect the phone as before when the time expires and update the TELCO card and account file to reflect a zero balance on the card. If the card user does decide to reload the card account, step 952 suspends the call and step 954 calls the reload subroutine described above. Once the card is reloaded, in step 956, the TELCO notifies the card user how much phone time remains on the card, step 958 reactivates the call, and the time decrement loop resumes.

In a process similar to the one illustrated in FIG. 7, the card account can be reloaded when the card user is away from the telephone. In step 980 in FIG. 9d, card user 10 provides to the agent, in the form cash, check, credit, or debit, the amount of money the card user want to place in the card account. In step 982, card user 10 inputs the PIN and the desired reload amount, and the agent transmits the card number, PIN, and reload amount to the PDC. The PDC accesses the TELCO, the TELCO checks its card file to verify that the PIN matches and that all other required criteria have been met, adds the reloaded value to the value in the account, and adds the reloaded value to the account file. In step 988, the TELCO acknowledges that the card account has been reloaded, and in 990, the card is again ready for use.

Besides using the prepaid card for purchase of goods and telephone services, the card can be used in other applications. Five examples are payroll fulfillment, including incentive fulfillment, gift fulfillment, promotion fulfillment, money transfer, and corporate relocation.

Payroll fulfillment is one example of batch activation illustrated in FIGS. 5a-5b. In the payroll fulfillment embodiment, instead of issuing paychecks or transferring wages to employees via Direct Deposit to an individual bank account, an employer pays its employees using the prepaid cards. The employer records the card number associated with each employee and assigns a PIN to each card number. The employer activates each card, loading into each card account the appropriate wage amount for each employee, distributes the card, and transmits to the employee, with the card or separately (via mail, electronic means, or other means), the assigned PIN. Once the card and PIN are received, the employee can change the PIN to one that can be more easily remembered. This can be done by calling a customer service number or by changing the PIN at a POS terminal, an agent terminal, an ATM, or some other approved device. Once value is in the card account, the employee can immediately begin to use the card. The card can now be used in the same manner as any prepaid card, allowing the employee to make purchases, withdraw cash, or reload the card. Because this card is a payroll card, when the next payday arrives, the employer adds the wage value to the card account, and it can again be used immediately by the employee. The employer always has the option of closing the card account, which also includes refunding the balance of value remaining in the account.

It is preferable that the employer place the whole value of the employee's net pay (i.e., gross pay less taxes and deductions) in the card account. However, it is also possible that an employee would merely wish to have a portion of his or her net pay placed in the card account. In addition, the employer could use the card in an incentive program, such as with bonuses or with one that rewards employees who work on commission. In this scenario, as the employees meet their targets, their card accounts are loaded with the appropriate incentive amount. This type of program eliminates the necessity for special handling procedures for paper checks and allows the employee immediate access to card account value.

The next application, gift fulfillment, allows a donor to purchase a prepaid card to give to someone else. In the flowchart in FIG. 10a, in step 1002, the donor purchases card 100 by providing payment in cash, check, credit, or debit form to agent terminal 402, just as was done in FIG. 4. In step 1004, the donor inputs the PIN to terminal 106, and, in step 1006, agent terminal 402 begins the activation process by transmitting to PDC 404 the card number, PIN, amount of the gift, and transaction code ("new"). PDC 404 checks to ensure that all issuer- or PDC-specific criteria have been met and, if met, sets up a new card and account file record, and the card is activated. In step 1008, the donor gives the card to the recipient along with the PIN which, in step 1010, the recipient can change immediately, if desired, by calling a customer service number or through an agent terminal, a POS terminal, an ATM, or some other approved device. From then on, the recipient uses the card as in step 1012, may reload the card account as in step 1014, and can close the card account, if the recipient so desires, as in step 1016. Such a card is secure before it is given to the recipient, because only the donor knows the PIN. The gift card is also more convenient than a check because it does not have to be cashed and it can be used immediately upon receipt. In addition, card issuer 102 can design the card to appeal to the collectors' market, and the card itself can act as a gift.

Another application, promotion fulfillment, was mentioned with regard to batch closure in FIG. 8b. In FIG. 10b, in step 1022, an issuer or promoter offers a promotion, for example, in conjunction with selling a new product. The cards can be designed to match the promotional theme. In step 1024, the promoter assigns PINs to a set of cards and batch activates the set, according to the process described in FIG. 5b. In step 1026, a customer purchases the promotional product, and, in return, in step 1028, the winning customers receive cards with PINs. In step 1030, the winners begin to use their cards as specified by the rules of the promotion for making purchases or cash withdrawals. Finally, in step 1032, the issuer or promoter closes the card accounts when the promotional period ends.

In a variation on the scenario described in FIG. 10b, instead of the issuer/promoter determining winners in step 1028, every customer who purchases the promotional product receives a card. However, there is value in only some of the cards' accounts, so only the customers who receive cards having value in the card account "win" the promotion. In addition, the card accounts can have a variable range of value, for example, eight with $50, four with $100, and two with $300, so that there can be a range of "winners."

Another variation on this promotion is that there is no competition at all to receive the cards—all purchasers of the promotional product receive a card which they can use as specified by the rules of the promotion. In this scenario, the cards act as a type of rebate.

A fourth application is using a prepaid card for transferring money from a sender to a beneficiary. In this application, a money transfer card is sold by prepaid card issuers or their agents in the sender's country, where the sender adds value to the card account. Another card is delivered to the beneficiary, who is likely in a different country, and who is able to make withdrawals at ATMs or purchases at POS terminals. As illustrated in FIG. 10c, in step 1072, the sender purchases card 100 as described in FIG. 4. Alternatively, if the sender already owns a card, the sender can reload the current card's account with the amount of value to be transferred. In step 1074, the sender selects a PIN, and, in step 1076, agent terminal 402 via PDC 404 activates the card. In step 1078, a second card that is able to access the sender's card account is delivered to the beneficiary. The beneficiary, in step 1080, uses the card, and, in step 1082, the sender can reload the card account, allowing the beneficiary to continue making purchases and cash withdrawals.

Figure 10E:
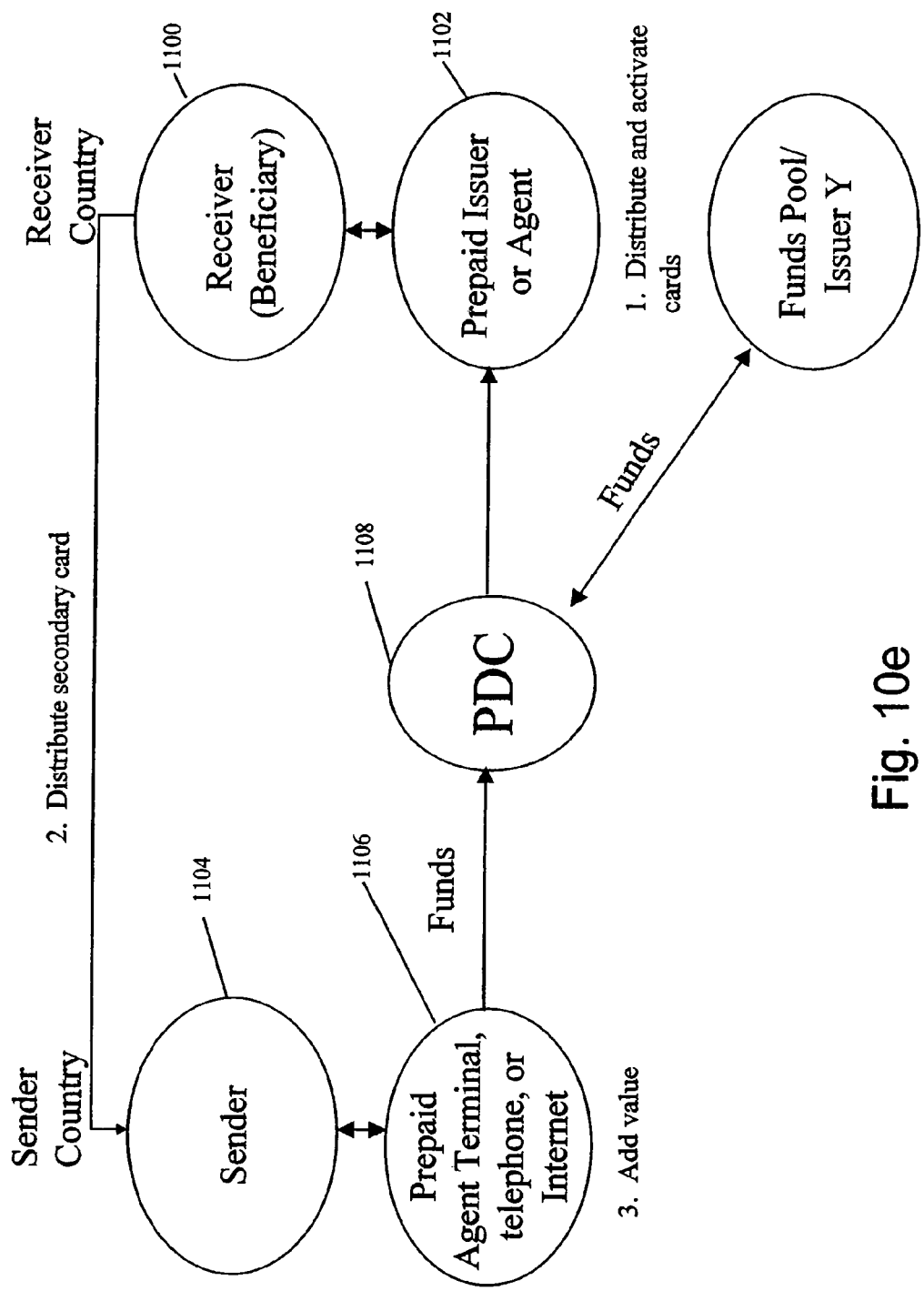
FIG. 10e is a flowchart illustrating a method of money transfer according to a preferred embodiment of the present invention.

FIG. 10e illustrates another method of money transfer according to a preferred embodiment of the present invention, which is an alternative to the above-described method of money transfer. In the embodiment of FIG. 10e, a prepaid card account may be opened by a beneficiary (transfer recipient) 1100 by visiting a prepaid card issuer or a prepaid agent 1102 in the beneficiary's country. The card issuer or prepaid agent issues at least two cards to the beneficiary and activates the cards using, for example, an agent terminal as described previously. The beneficiary forwards one of the prepaid cards to a sender (transfer initiator) 1104. To effect the money transfer, the sender adds value to the prepaid account. The sender may add value by going to a prepaid agent 1106 and providing the amount of money to be placed in the card account in the form of cash, check, credit, debit, or any other mode of payment. Alternatively, the sender may add value to the card account by using a telephone or Internet interface to the PDC 1108 and providing payment in the form of credit card, debit card, or other appropriate form of payment. Once the value is added to the prepaid account, the beneficiary may then use the prepaid card at merchants to make purchases or at ATMs or money transfer agents to make cash withdrawals. Once a sender has received a card from a beneficiary, the sender may subsequently transfer more money to the beneficiary by simply reloading the card account with an additional amount of value to be transferred.

Money transfers using prepaid cards have a number of benefits over traditional money transfers, in which the sender goes to a money transfer agent (such as WESTERN UNION) and deposits the money to be transferred and the recipient then retrieves the money in cash from an associated agent in the recipient's country. Firstly, the prepaid card transfer according to the presently claimed invention is more convenient for the parties because only one of the parties must visit a card issuer or money transfer agent and, after the initial visit to the money transfer agent or card issuer, there is no need for the beneficiary or sender to return to the money transfer agent or card issuer for subsequent money transfers. Secondly, the prepaid card transfer according to the presently claimed invention is more secure than traditional methods because the money transfer is not received in cash from the money transfer agent. In addition, in the case where the prepaid cards are issued to the beneficiary, the prepaid card account does contain any value until after one of the cards is mailed to the sender and the sender adds value to the card account.

A fifth application, the corporate relocation card, acts much like a payroll card. This card can be issued to new or current employees who are relocating at the company's expense. The card provides the card user immediate access to ATMs and/or POS terminals, and is used to cover miscellaneous costs associated with the relocation, for example, meals, gas, and other cash outlays. The card account can be reloaded by the employer on an as-needed basis. As illustrated in FIG. 10d, in step 1086, the issuer assigns PINs to card numbers and activates the cards per the employer's instructions. In step 1088, the employer or issuer distributes the card to the relocating employees, and, in step 1090, the employees select a PIN that is more easily remembered. In step 1092, the employees use the card to pay relocation expenses. If the value on the card becomes too low, in step 1094, the employer can reload the card account, and the employee can continue to use the card in the same manner. Optionally, the card account can be closed as shown in step 1096.

Another use for the invention is in electronic commerce, such as making purchases via the Internet. To facilitate electronic commerce, a personal computer outfitted with a card reader is used as a terminal. A card user inserts the card into the card reader, connects via the Internet to a vendor's World Wide Web site, and chooses from the Web site an item or items to purchase. The user transmits the PIN, the card reader transmits the card number, and the vendor transmits the purchase price to the PDC. In this scenario, the Internet can act as a communications network. As with any POS purchase, the PDC checks the Card File to verify that the PIN matches, checks the balance on the card to verify that it can cover the purchase, and checks to determine that all issuer- and PDC-specific criteria have been met. Once these steps are verified, the PDC decrements the balance in the card account and in the Account File by the amount of the purchase and transmits an approval to the vendor and possibly to the card user. Alternatively, the vendor forwards the approval to the card user. Then the vendor sends the card user the items purchased.

Although the present invention has been described with reference to certain preferred embodiments, various modifications, alterations, and substitutions will be known or obvious to those skilled in the art without departing from the spirit and scope of the invention, as defined by the appended claims.

We claim:

1. A method for transferring money between two parties, each holding a prepaid card associated with the same account, comprising:
   a) issuing to a first party at least two prepaid cards sharing an associated prepaid card account, said account adapted to hold value representative of money transferable at least between said parties using said cards;
   b) sending at least one of said prepaid cards to a second party;

c) adding value to said card account by one of the first party or second party using one of said prepaid cards in the possession of the party adding said value;

d) using one of said prepaid cards in a card transaction by the party other than the one adding said value in step (c).

2. The method of claim 1, in which the first party is the party adding value to said card account.

3. The method of claim 1, in which the second party is the party adding value to the card account.

4. The method of claim 1, in which the step of using one of the said prepaid cards in a card transaction includes purchasing a good or service using a prepaid card at a point-of-sale (POS) terminal.

5. The method of claim 1, in which the step of using one of the said prepaid cards in a card transaction includes withdrawing cash from an ATM using a prepaid card.

6. The method of claim 1, in which the step of using one of the said prepaid cards in a card transaction includes withdrawing cash from a money transfer agent using a prepaid card.

* * * * *